United States Patent
Qiao

(10) Patent No.: US 10,234,965 B2
(45) Date of Patent: *Mar. 19, 2019

(54) ACTIVE STYLUS DIFFERENTIAL SYNCHRONIZATION

(71) Applicant: Microsoft Technology Licensing, LLC, Redmond, WA (US)

(72) Inventor: Tianzhu Qiao, Portland, OR (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/589,955

(22) Filed: May 8, 2017

(65) Prior Publication Data

US 2018/0217686 A1 Aug. 2, 2018

Related U.S. Application Data

(60) Provisional application No. 62/453,869, filed on Feb. 2, 2017.

(51) Int. Cl.
*G06F 3/0354* (2013.01)
*G06F 3/044* (2006.01)
(Continued)

(52) U.S. Cl.
CPC .......... *G06F 3/03545* (2013.01); *G06F 3/044* (2013.01); *G06F 3/0416* (2013.01); *G06F 3/04883* (2013.01)

(58) Field of Classification Search
CPC .................................................. G06F 3/03545
See application file for complete search history.

(56) References Cited

U.S. PATENT DOCUMENTS

2012/0092350 A1 4/2012 Ganapathi et al.
2012/0105361 A1 5/2012 Kremin et al.
(Continued)

FOREIGN PATENT DOCUMENTS

WO 2017023449 A1 2/2017

OTHER PUBLICATIONS

"Atmel Ships Second Generation Maxstylus Active Pen Delivering Superior 'Pen-to-Paper' Writing Experience", http://www.atmel.com/about/news/release.aspx?reference=tcm:26-53101, Published on: Jan. 7, 2014, 2 pages.
(Continued)

*Primary Examiner* — Benjamin C Lee
*Assistant Examiner* — Dong Hui Liang
(74) *Attorney, Agent, or Firm* — Alleman Hall Creasman & Tuttle LLP

(57) ABSTRACT

A touch-sensing system is disclosed. The system includes a display device including a touch sensor having a plurality of electrodes, and drive logic coupled to the plurality of electrodes and configured to drive the plurality of electrodes during a plurality of touch-sensing frames, each of which includes a stylus sync sub-frame during which the drive logic drives at least some of the plurality of electrodes, referred to for that stylus sync sub-frame as sync-driven electrodes, with synchronization waveforms that are communicated electrostatically to cause synchronization of the display device with an active stylus. For each of the stylus sync sub-frames, the drive logic may be configured to differentially drive the sync-driven electrodes of such stylus sync sub-frame, such that a first synchronization waveform used to drive one of the sync-driven electrodes is different than a second synchronization waveform used to drive another of the sync-driven electrodes.

20 Claims, 10 Drawing Sheets

(51) Int. Cl.
  *G06F 3/041*  (2006.01)
  *G06F 3/0488* (2013.01)

(56) References Cited

U.S. PATENT DOCUMENTS

| | | |
|---|---|---|
| 2014/0240298 A1 | 8/2014 | Stern |
| 2014/0347320 A1 | 11/2014 | Ribeiro et al. |
| 2014/0362035 A1 | 12/2014 | Mo et al. |
| 2015/0177868 A1 | 6/2015 | Morein et al. |
| 2015/0193033 A1 | 7/2015 | Westhues |
| 2016/0011688 A1 | 1/2016 | Wang |
| 2016/0048234 A1 | 2/2016 | Chandran et al. |
| 2016/0062519 A1* | 3/2016 | Park .................. G06F 3/047 345/173 |
| 2016/0170506 A1 | 6/2016 | Westhues et al. |
| 2016/0179226 A1 | 6/2016 | Shepelev et al. |
| 2016/0188005 A1 | 6/2016 | Ju et al. |
| 2016/0188006 A1 | 6/2016 | Han et al. |
| 2016/0239123 A1 | 8/2016 | Ye et al. |
| 2017/0038884 A1 | 2/2017 | Qiao |

OTHER PUBLICATIONS

"International Search Report and Written Opinion Issued in PCT Application No. PCT/US2018/015646", dated May 23, 2018, 13 Pages.

* cited by examiner

ACTIVE STYLUS DIFFERENTIAL SYNCHRONIZATION

CROSS REFERENCE TO RELATED APPLICATIONS

This application claims priority to U.S. Provisional Patent Application No. 62/453,869, filed Feb. 2, 2017, the entirety of which is hereby incorporated herein by reference.

BACKGROUND

Some touch sensors are configured to detect touch input by sensing changes in capacitance at electrode locations in an electrode matrix. Touch inputs may be from a user's body (e.g., a finger) and, in some cases, a passive or active stylus. In active-stylus implementations, the stylus may be synchronized with the touch sensor to achieve a shared sense of time between the stylus and touch sensor. This may, among other things, facilitate determinations of stylus position relative to the touch sensor.

Multiple electrodes of the matrix may be driven simultaneously with a synchronization waveform. Via capacitive coupling, this causes current to flow into a tip electrode of the stylus. The current pattern is processed in receive logic of the stylus to achieve synchronization. Current flowing into the stylus tip may be affected by various capacitances and other conditions.

DETAILED DESCRIPTION

Figure 1:
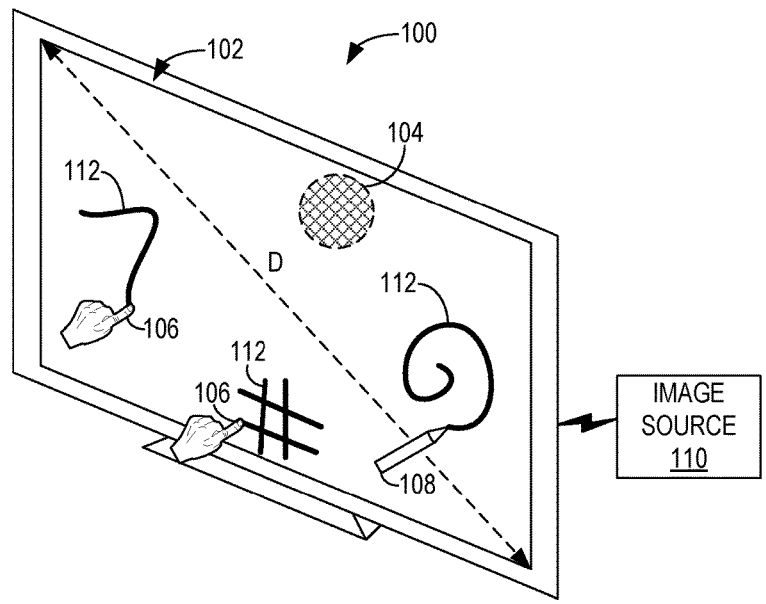
FIG. 1 shows an example display device including a touch sensor receiving touch inputs from a user's body and an active stylus.

Some touch sensors are configured to detect touch input by sensing changes in capacitance in an electrode matrix. As used herein, "matrix" refers to, among other things, intersections between elongate row and column electrodes at which mutual capacitance is measured by driving at one, and receiving at the other, of the row and column electrodes. In other examples, "matrix" also refers to an array of locations where the self-capacitance of electrodes is measured, with both driving and receiving occurring at the electrodes. Indeed, "matrix" is applicable to any electrode scheme in which capacitance measurements are localized to XY coordinates across a touch-sensitive display or other expanse. In the examples herein, touch inputs may be detected from contact and/or hover of a user's body (e.g., a finger) and an active stylus over the electrode matrix. The stylus may be synchronized with the touch sensor to achieve a shared sense of time between the stylus and touch sensor (and/or a display device incorporating the touch sensor). Among other things, the shared sense of time facilitates determinations of relative stylus position.

Synchronization typically is performed every touch-sensing frame during a sub-frame referred to as a stylus sync sub-frame. During a stylus sync sub-frame, electrodes are driven with synchronization waveforms. For a given stylus sync sub-frame, the activated electrodes are referred to as sync-driven electrodes. Via capacitive coupling of sync-driven electrodes with a tip electrode in the active stylus, synchronization signals are received into receive logic of the stylus, in the form of current patterns flowing into the stylus tip (e.g., time varying current waveform). The inbound current pattern is processed in the receive logic to perform synchronization. In the examples herein, electrodes spanning the matrix (e.g., a subset of electrodes) are activated as sync-driven electrodes, allowing the stylus to achieve synchronization regardless of its vertical coordinate relative to the electrodes.

Current flowing into the stylus tip may be affected by various capacitances and other conditions. One challenge in particular may occur when the user's body comes into contact with the matrix. Even when such contact is relatively small (e.g., a fingertip as opposed to a resting palm), the contact patch will typically result in a relatively large increase in capacitance between the user's body and activated sync-driven electrodes. For example, as compared to the relatively small stylus tip, the user's body may overlap a greater number of sync-driven electrodes, and/or over a greater portion of the overlapped electrodes. Accordingly, the increase in body-to-matrix capacitance resulting from body contact may be significantly larger than the increase in stylus-to-matrix capacitance resulting from stylus tip contact. This may produce a change at various voltage nodes to cause a current flow into the user's body of sufficient magnitude to undesirably degrade current flow into the stylus tip, thereby reducing synchronization performance.

Accordingly, the disclosure contemplates differential driving of sync-driven electrodes within stylus sync sub-frames. Specifically, at least some different synchronization waveforms are used for different sync-driven electrodes. One sync-driven electrode might be driven with one waveform, while another, different synchronization waveform is used for another sync-driven electrode. In some cases, two waveforms may be used (e.g., two waveforms of inverse polarity) to drive sync-driven electrodes. In other cases, three or more different waveforms may be used. In some examples, two-value pulse trains are employed (e.g., binary waveforms). In other cases, employed waveforms may include digital waveforms taking on a greater range of values, analog waveforms, or any other type of waveforms.

Differential waveforms may be employed to provide cancellation to reduce current into a user's body. For example, within a given spatial grouping of sync-driven electrodes, differential waveforms may be employed so as to produce at least partially cancelling electrical conditions. Therefore, for a user body contact patch over that spatial grouping, current flowing into the user's body is reduced relative to what would occur with undifferentiated driving (using the same waveform on all of the sync-driven row electrodes in the grouping).

In some examples, different sets of sync-driven electrodes may be employed for different stylus sync sub-frames, with different synchronization waveforms being used in each set. In other words, one set of sync-driven electrodes might be employed for one sub-frame, with a second, different set of sync-driven electrodes employed for the next sub-frame. Any number of sets may be employed. Typically, the sets differ in that one or more electrodes function as sync-driven electrodes in one set, but not in another set. Reasons for omitting some electrodes from being activated during a sync sub-frame will be explained in detail below. For a given stylus contact point, shifting synchronization waveforms via use of different sets from frame-to-frame changes the distance between those waveforms and the stylus contact point, which affects the signals received into the stylus. One of the sets may be preferred for a given contact point, in that it brings a useful waveform close to the stylus, while having potentially canceling waveforms further away from the stylus. In such a setting, position information of the stylus may be used to select a particular set for an upcoming sync sub-frame (i.e., selecting a set which results in a desired waveform being positioned as close as possible to the current stylus location).

Figure 8:
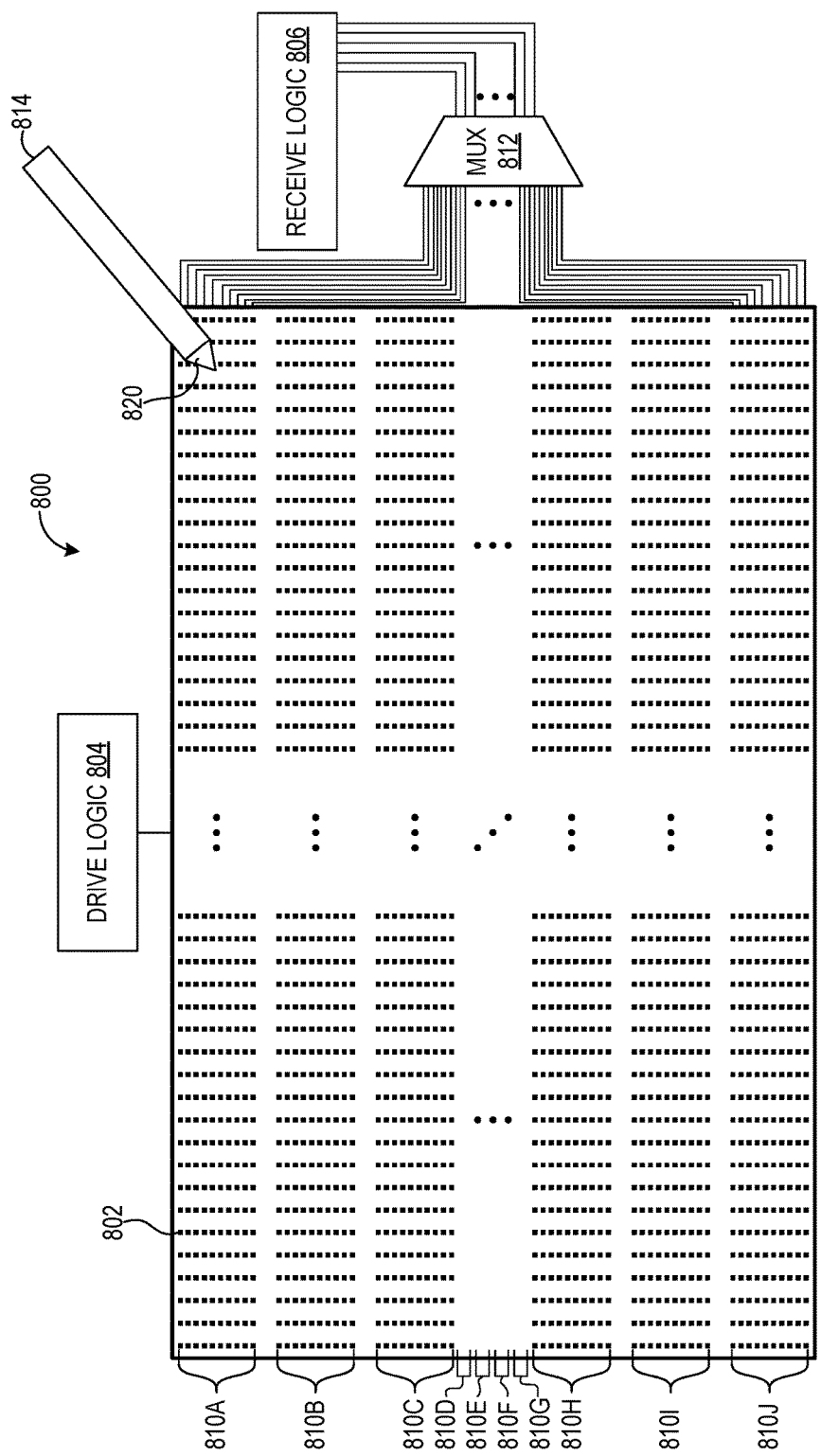
FIG. 8 shows an example in-cell touch sensor matrix.
Figure 9:
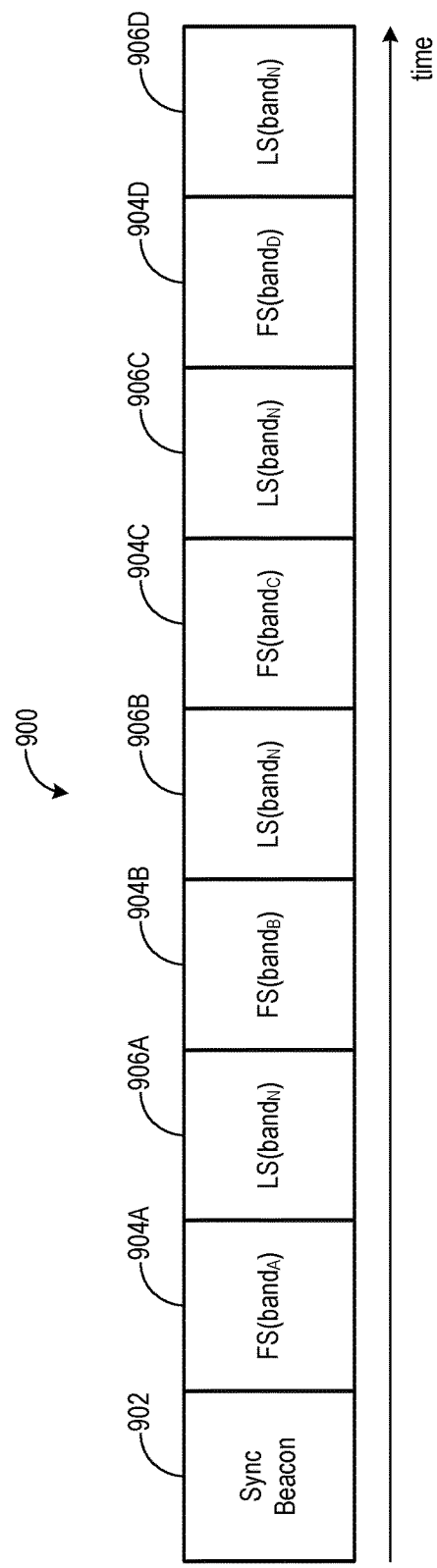
FIG. 9 shows an example touch-sensing frame of the in-cell touch sensor matrix of FIG. 8.
Figure 10:
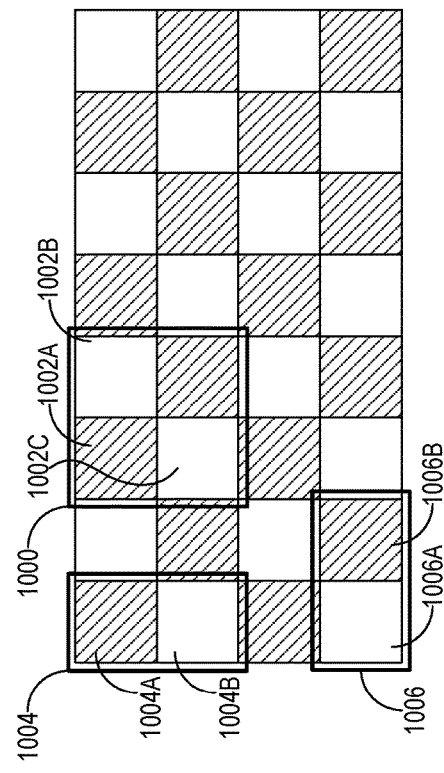
FIG. 10 shows an example sensel grouping.

Approaches to differentially driving electrodes in a touch sensor are disclosed herein for both sensors that employ mutual capacitance sensing in a row/column electrode matrix, and for sensors that employ self-capacitance sensing in an electrode matrix. In particular, FIGS. 2-6 depict examples that relate to mutual capacitance sensing, whereas FIGS. 8-10 depict examples that relate to self-capacitance sensing. It will be understood that at least some of the approaches to differential electrode driving described with reference to mutual capacitance sensing may be employed in connection with self-capacitance sensing, and that at least some of the approaches to differential electrode driving described with reference to self-capacitance sensing may be employed in connection with mutual capacitance sensing, where adjustment may be potentially made when translating a differential driving method from one sensor type to another.

FIG. 1 shows a touch interactive display system 100 including a display device 102 that has a touch sensor 104. In some examples, display device 102 may be a large format display with a diagonal dimension D greater than 1 meter, though the display may assume any suitable size. Display device 102 may be configured to sense one or more sources of input, such as touch input imparted via a digit 106 of a user and/or input supplied by an input device 108, shown in FIG. 1 as a stylus. Digit 106 and input device 108 are provided as non-limiting examples and any other suitable source of input may be used in connection with display device 102. Display device 102 may be configured to receive input from styluses and digits in contact with the display and/or "hovering" over the display surface. "Touch input" as used herein refers to both digit and non-digit (e.g., stylus) input, and to input supplied by input devices both in contact with, and spaced away from but proximate to, display device 102. In some examples, display device 102 may be configured to receive input from two or more sources simultaneously, in which case the display may be referred to as a multi-touch display.

Display device 102 may be operatively coupled to an image source 110, which may be, for example, a computing device external to, or housed within, the display. Image source 110 may receive input from display device 102, process the input, and in response generate appropriate graphical output 112 for the display. In this way, display device 102 may provide a natural paradigm for interacting with a computing device that can respond appropriately to touch input. Details regarding an example computing device are described below with reference to FIG. 13.

Figure 2:
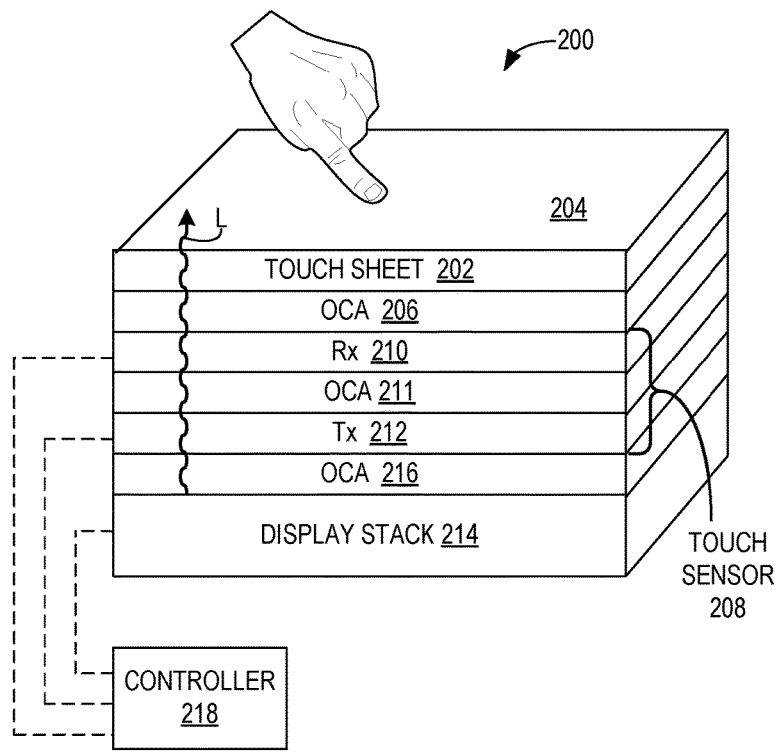
FIG. 2 shows a cross-sectional view of an optical stack of the display device of FIG. 1.

FIG. 2 is a cross-sectional view of an optical stack 200 of display device 102 (FIG. 1). Optical stack 200 includes a plurality of components configured to enable the reception of touch input and the generation of graphical output. As shown in FIG. 2, optical stack 200 may include an optically clear touch sheet 202 having a top surface 204 for receiving touch input, and an optically clear adhesive (OCA) 206 bonding a bottom surface of the touch sheet to a top surface of a touch sensor 208, which may be touch sensor 104 (FIG. 1), for example. Touch sheet 202 may be comprised of any suitable materials, such as glass or plastic. As used herein, "optically clear adhesive" refers to a class of adhesives that transmit substantially all (e.g., about 99%) of incident visible light.

As described in further detail below with reference to FIG. 3, touch sensor 208 includes a matrix of electrodes that form capacitors whose capacitances may be evaluated in detecting touch input. As shown in FIG. 2, the electrodes may be formed in two separate layers: a receive electrode layer (Rx) 210 and a transmit electrode layer (Tx) 212 positioned below the receive electrode layer. Receive and transmit electrode layers 210 and 212 may each be formed on a respective dielectric substrate comprising materials including but not limited to glass, polyethylene terephthalate (PET), or cyclic olefin polymer (COP) film. Receive and transmit electrode layers 210 and 212 may be bonded together by a second optically clear adhesive 211. OCA 211 may be an acrylic pressure-sensitive adhesive film, for example. The touch sensor configuration illustrated in FIG. 2 is provided as an example; alternative arrangements are within the scope of this disclosure. In other implementations, for example, layers 210, 211, and 212 may be integrally formed as a single layer with electrodes disposed on opposite surfaces of the integral layer. Further, touch sensor 208 may alternatively be configured such that transmit electrode layer 212 is provided above, and bonded to via OCA 211, with receive electrode layer 210 being positioned therebelow.

Receive and transmit electrode layers 210 and 212 may be formed by a variety of suitable processes. Such processes may include deposition of metallic wires onto the surface of an adhesive, dielectric substrate; patterned deposition of a material that selectively catalyzes the subsequent deposition of a metal film (e.g., via plating); photoetching; patterned deposition of a conductive ink (e.g., via inkjet, offset, relief, or intaglio printing); filling grooves in a dielectric substrate with conductive ink; selective optical exposure (e.g., through a mask or via laser writing) of an electrically conductive photoresist followed by chemical development to remove unexposed photoresist; and selective optical exposure of a silver halide emulsion followed by chemical development of the latent image to metallic silver, in turn followed by chemical fixing. In one example, metalized sensor films may be disposed on a user-facing side of a substrate, with the metal facing away from the user or alternatively facing toward the user with a protective sheet (e.g., comprised of PET) between the user and metal. Although transparent conducting oxide (TCO) is typically not used in the electrodes, partial use of TCO to form a portion of the electrodes with other portions being formed of metal is possible. In one example, the electrodes may be thin metal of substantially constant cross section, and may be sized such that they may not be optically resolved and may thus be unobtrusive as seen from a perspective of a user. Suitable materials from which electrodes may be formed include various suitable metals (e.g., aluminum, copper, nickel, silver, gold), metallic alloys, conductive allotropes of carbon (e.g., graphite, fullerenes, amorphous carbon), conductive polymers, and conductive inks (e.g., made conductive via the addition of metal or carbon particles).

Continuing with FIG. 2, touch sensor 208 may be bonded, at a bottom surface of transmit electrode layer 212, to a display stack 214 via a third optically clear adhesive 216. Display stack 214 may be a liquid crystal display (LCD) stack, organic light-emitting diode (OLED) stack, or plasma display panel (PDP), for example. Display stack 214 is configured to emit light L through a top surface of the display stack, such that emitted light travels in a light emitting direction through layers 216, 212, 211, 210, 206, touch sheet 202, and out through top surface 204. In this way, emitted light may appear to a user as an image displayed on top surface 204 of touch sheet 202.

Further variations to optical stack 200 are possible. For example, implementations are possible in which layers 211 and/or 216 are omitted. In this example, touch sensor 208 may be air-gapped and optically uncoupled to display stack 214. Further, layers 210 and 212 may be laminated on top surface 204. Still further, layer 210 may be disposed on top surface 204 while layer 212 may be disposed opposite and below top surface 204.

FIG. 2 also shows a controller 218 operatively coupled to receive electrode layer 210, transmit electrode layer 212, and display stack 214. Controller 218 is configured to drive transmit electrodes in transmit electrode layer 212, receive signals resulting from driven transmit electrodes via receive electrodes in receive electrode layer 210, and locate, if detected, touch input imparted to optical stack 200. Controller 218 may further drive display stack 214 to enable graphical output responsive to touch input. Two or more controllers may alternatively be provided, and in some examples, respective controllers for each of receive electrode layer 210, transmit electrode layer 212, and display stack 214. In some implementations, controller 218 may be implemented in image source 110 (FIG. 1).

Figure 3:
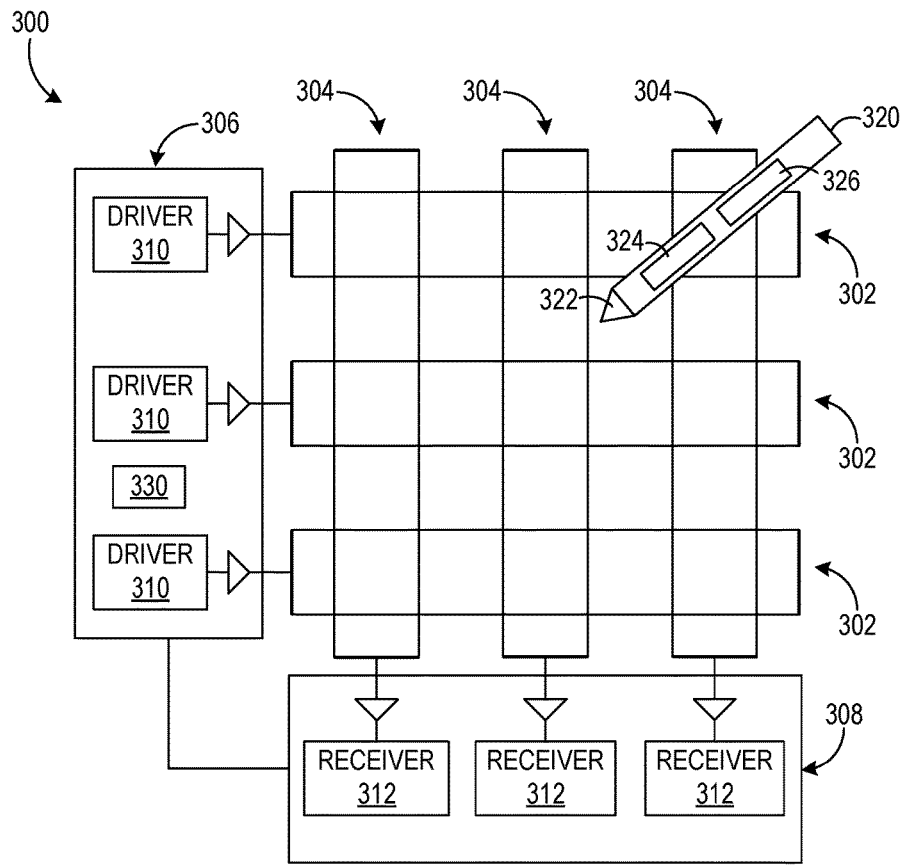
FIG. 3 shows an example touch sensor matrix and active stylus.

FIG. 3 shows an example touch sensor matrix 300. Matrix 300 may be included in touch sensor 208 of optical stack 200 (FIG. 2) to bestow touch sensing functionality to display device 102 (FIG. 1), for example. Matrix 300 includes a plurality of row electrodes and column electrodes. In the present example, the electrodes are shown in the form of row electrodes 302 vertically separated from column electrodes 304. As described below, the row electrodes may be transmitters/drivers, with voltage waveforms (also referred to as "excitation waveforms") being used to stimulate them via operation of drive logic. This in turn affects electrical conditions on the column electrodes (e.g., the excitation waveform produces a time-varying current on the column electrode), and the column electrodes operate in a receive mode with accompanying circuitry to process the induced electrical conditions. Referring again to FIG. 2, row electrodes 302 and column electrodes 304 may be respectively formed in transmit electrode layer 212 and receive electrode layer 210 of optical stack 200, for example. Each intersection of row electrodes 302 with column electrodes 304 forms a corresponding node whose electrical properties (e.g., capacitance) may be measured to detect touch input. Three row electrodes 302 and three column electrodes 304 are shown in FIG. 3 for the purpose of clarity, though matrix 300 may include any suitable number of row electrodes and column electrodes, which may be on the order of one hundred or one thousand, for example. Any suitable number of electrodes may be employed, depending on the setting.

While a rectangular grid arrangement is shown in FIG. 3, matrix 300 may assume other geometric arrangements—for example, the matrix may be arranged in a diamond pattern. Alternatively or additionally, individual electrodes in matrix 300 may assume nonlinear geometries—e.g., electrodes may exhibit curved or zigzag geometries, which may minimize the perceptibility of display artifacts (e.g., aliasing, moiré patterns) caused by occlusion of an underlying display by the electrodes. In addition, "row" and "column," as used herein, does not imply any particular orientation relative to the display or to the floor/ground. In other words, relative to the display device or floor/ground, rows may be horizontal, vertical or in any other orientation. Typically, however, all of the rows will be parallel to one another, as will all of the columns.

The depicted system may also include drive logic 306 coupled to the row electrodes 302 and receive logic 308 coupled to the column electrodes 304. Drive logic 306 and receive logic 308 may perform a variety of functions, and may, as in the present example, be interconnected in order to coordinate activity, exchange data, etc. In general, drive logic 306 is involved in causing excitation waveforms to be applied to row electrodes 302, while receive logic 308 is involved in processing and interpreting signals on column electrodes 304.

Each row electrode 302 in matrix 300 may be coupled to a respective driver 310 (included in drive logic 306) configured to drive its corresponding row electrode with an excitation waveform (e.g., a time-varying voltage). In some implementations, drivers 310 of matrix 300 may be driven by a micro-coded state machine implemented within a field-programmable gate array (FPGA) forming part of controller 218 (FIG. 2), for example. Each driver 310 may be implemented as a shift register having one flip-flop and output for its corresponding row electrode, and may be operable to force all output values to zero, independently of register state. The inputs to each shift register may be a clock, data input, and a blanking input, which may be driven by outputs from the micro-coded state machine. Signals may be transmitted by filling the shift register with ones on every output to be excited, and zeroes elsewhere, and then toggling the blanking input with a desired modulation to create a transmitted waveform for exciting a row electrode. The excitation waveforms may be time-varying voltages that, when digitally sampled, comprise a sequence of pulses—e.g., one or more samples of a relatively higher (or lower) digital value followed by one or more samples of a relatively lower (or higher) digital value. If a shift register is used in this fashion, waveforms may take on only two digital values—e.g., only binary waveforms can be transmitted. In other implementations, drivers 310 may be configured to transmit non-binary waveforms that can assume three or more digital values. Non-binary excitation waveforms may enable a reduction in the harmonic content of driver output and decrease the emissions radiated by matrix 300. In still other examples, non-quantized waveforms may play a role in row electrode excitation. Any practicable method may be employed by drive logic 306 to generate appropriate excitation waveforms on the row electrodes 302.

In some implementations, matrix 300 may be configured to communicate and interact with an active stylus 320 (e.g., corresponding to input device 108 of FIG. 1), which may include a tip electrode 322 (also referred to as the stylus electrode or stylus tip); drive logic 324 responsible for applying waveforms to tip electrode 322 for transmission to matrix 300; and receive logic 326 responsible for processing waveforms received from matrix 300 (e.g., as a result of drive logic 306 exciting a row electrode 302 in close proximity to the stylus tip). In the context of FIG. 1, use of a stylus such as active stylus 320 may at least partially enable touch sensitive display device 102 to communicate with input device 108 when matrix 300 is implemented in display device 102. Specifically, an electrostatic link may be established between tip electrode 322 and one or more row electrodes 302 or one or more column electrodes 304, along which data may be transmitted.

In one example, electrostatic communication is conducted via transmission of a synchronization waveform from matrix 300 to the active stylus 320. The synchronization waveform may enable matrix 300 and stylus 322 to obtain a shared sense of time. In some examples, synchronization waveforms may be transmitted via multiple row electrodes 302 simultaneously so that the active stylus can receive the synchronization waveform regardless of the active stylus's position relative to the matrix. In the case that waveforms are transmitted by multiple row electrodes 302 simultaneously, different waveforms may be used on different row electrodes 302, as explained in detail below. In some cases, synchronization may be performed via correlation operations, in which received waveforms are processed using reference waveforms that are based on the synchronization waveforms.

The shared sense of time may facilitate the correlation of a time at which the stylus detects a signal transmitted on row electrodes 302 to a location on matrix 300. Such correlation may enable the stylus to determine at least one coordinate (e.g., its row coordinate) relative to matrix 300, which may be transmitted back to the matrix (e.g., via the electrostatic link) or to an associated display via a different communication protocol (e.g., radio, Bluetooth). To determine a second coordinate (e.g., a column coordinate) of the stylus, all row electrodes 302 may be held at a constant voltage, and the stylus may transmit a time-varying voltage to matrix 300, which may measure currents resulting from the stylus voltage in each column electrode 304 to ascertain the second coordinate.

Each column electrode 304 in matrix 300 may be coupled to a respective receiver 312 configured to analyze received signals resulting from the transmission of waveforms on row electrodes 302. During touch detection, matrix 300 may hold all row electrodes 302 at a constant voltage except for an active row electrode 302 along which an excitation waveform is transmitted. During transmission of the excitation sequence, all column electrodes 304 may be held at a constant voltage (e.g., ground). With the excitation waveform applied to the active row electrode 302 and all column electrodes 304 held at the constant voltage, a current may flow into each of the receivers 312 as a result of application of the excitation waveform. This current is proportional to the capacitance. Touch detection is achieved as a result of the change in capacitance produced, for example, by the presence of a user's finger. Matrix 300 may be repeatedly scanned at a frame rate (e.g., 60 Hz, 120 Hz) to persistently detect touch input, where a complete scan of a frame comprises applying an excitation sequence to each transmit row 302, and for each driven transmit row, collecting output from all of the receive columns 304. However, in other examples, a complete scan of a frame may be a scan of a desired subset, and not all, of one or both of transmit row electrodes 302 and receive column electrodes 304.

Higher resolution positional determinations of both a user's finger and an active stylus may be achieved via interpolation methods. Using the above example of determining a stylus's row coordinate, measurements for rows on either side of a highest-signal row may be assessed. Assuming the stylus detects a highest signal strength at time t(K), corresponding to the excitation of row K, the system may also take readings from any number or distribution of neighboring row electrodes. In one non-limiting example, measurements are assessed for rows K−2, K−1, K+1 and K+2. The distribution of received signal strength across these rows enables the system to increase the positional resolution. Similarly, when the stylus is transmitting through operation of drive logic 324, one of the column electrodes 304 receives the strongest signal (i.e., the nearest column to the stylus). Signal strength at nearby columns can be used for interpolation. Similar interpolation methods may be used for determining finger/hand position (i.e., measure strength of signals neighboring the highest-signal column or highest-signal row).

Figure 4:
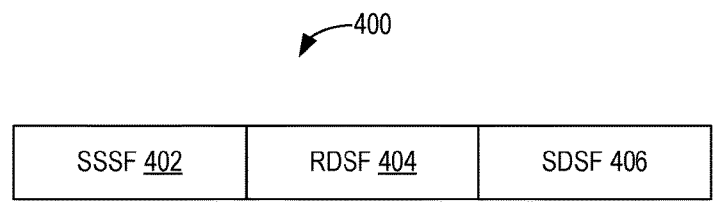
FIG. 4 shows an example touch-sensing frame, including a stylus sync sub-frame during which the active stylus and display device of FIGS. 1 and 3 may communicate electrostatically to synchronize the display device and stylus.

From the above, it will be appreciated that touch functionality (from user's body and stylus) occurs over an ongoing series of touch-sensing frames, during which drive logic in matrix 300 or stylus 320 drive electrodes therein to transmit waveforms to receiving electrodes, where the received signals are processed by receive logic (e.g., receive logic 308 or receive logic 326). FIG. 4 depicts an example touch-sensing frame 400. Each touch-sensing frame 400 includes a number of different sub-frames. One sub-frame is a stylus sync sub-frame (SSSF) 402, during which, as described above, row electrodes 302 on matrix 300 transmit synchronization waveforms to enable stylus 320 and display device 102 to gain/maintain a shared sense of time.

During any given stylus sync sub-frame (SSSF) 402, the specific row electrodes 302 being driven with synchronization waveforms are referred to, for that stylus sync sub-frame (SSSF) 402, as sync-driven row electrodes. The specific sync-driven row electrodes being used may vary from one stylus sync sub-frame (SSSF) 402 to the next. In some cases, multiple different sets of sync-driven row electrodes may be employed, each of which omits some row electrodes 302 (e.g., two out of every three). In other words, a given row electrode 302 may be a sync-driven row electrode in one set, but not in another. In some examples, a set of sync-driven row electrodes may use differing synchronization waveforms (i.e., a waveform used on one sync-driven row electrode differs from that used on another in the set). Sync-driven row electrodes and the synchronization waveforms employed with them will be discussed in more detail below.

Two other sub-frames, also discussed above, which may be employed, are (1) a row-drive sub-frame (RDSF) 404 during which row electrodes are driven sequentially to support determination of a row coordinate of stylus 320 and row and column coordinates of user's body 106; and (2) a stylus-drive sub-frame (SDSF) 406 during which stylus 320 is driven to facilitate determination of its column coordinate. Touch-sensing frames typically repeat at relatively high frequencies to support rapidly updated touch detection with minimal lag (e.g., between finger movement and a line being drawn under the user's finger). In one example, a frame rate of 120 Hz may be employed.

During the stylus sync sub-frames (SSSFs) 402, gaining and maintaining proper synchronization may depend upon whether a current having sufficient magnitude is flowing into stylus electrode 322. Current flowing into stylus electrode 322 may depend on various capacitances during the stylus sync sub-frames (SSSFs) 402. The most relevant capacitances may be (1) Cts—capacitance from the stylus electrode 322 to row electrodes 302 being driven with synchronization waveforms; (2) Ctg—capacitance from stylus electrode 322 to a chassis ground of display device 102 or equivalent (e.g., receive column electrodes 304 or inactive row electrodes 302); (3) Cbs—capacitance from the user's body 106 to row electrodes 302 being driven with synchronization waveforms (i.e., sync-driven row electrodes); and (4) Cbg—capacitance from the user's body 106 to a chassis ground of display device 102 or equivalent.

Three conditions will now be described, along with their potential effect upon current flowing into stylus electrode 322 in the case of undifferentiated driving of the sync-driven row electrodes. The first condition may be described as:

$$Cts/(Cts+Ctg) \gg Cbs/(Cbs+Cbg)$$

Under these circumstances (equation 1 above), synchronization waveforms on row electrodes 302 may cause sufficient current to flow into stylus electrode 322 (e.g., of sufficient SNR to derive useful synchronization information from the inbound waveform).

The second condition may be described as:

$$Cts/(Cts+Ctg) \approx Cbs/(Cbs+Cbg) \quad (2)$$

Under these circumstances (equation 2 above), synchronization waveforms on row electrodes 302 may cause negligible current to flow into stylus electrode 322. As a result, stylus 320 is not able to receive a sufficiently strong signal to support synchronization.

The third condition may be described as:

$$Cts/(Cts+Ctg) \ll Cbs/(Cbs+Cbg) \quad (3)$$

Under these circumstances (equation 3 above), synchronization waveforms on row electrodes 302 may cause current to flow out of stylus electrode 322. Such reverse polarity/phase current may also hinder synchronization.

In many cases, capacitance of the user's body to driven rows of matrix 300 (Cbs) will have the strongest effect on which of the above three conditions exist during any given stylus sync sub-frame. Specifically, when the user touches display device 102 over matrix 300, Cbs increases. The increase may be substantial, particularly in the not-infrequent case of a large contact patch (e.g., user rests their palm on the display while holding the stylus). In such a case, the user's body significantly covers sync-driven row electrodes during a series of stylus sync sub-frames (SSSFs) 402. Relative to when the stylus contacts the display, the user's body overlaps more sync-driven row electrodes, and overlaps them along a greater length. As a result of the relatively large increase in Cbs and the associated change at various voltage nodes, increased current may flow into the user's body, thereby reducing current into the stylus electrode, in turn hindering the ability of the stylus to obtain a sufficiently strong synchronization signal.

Figure 5:
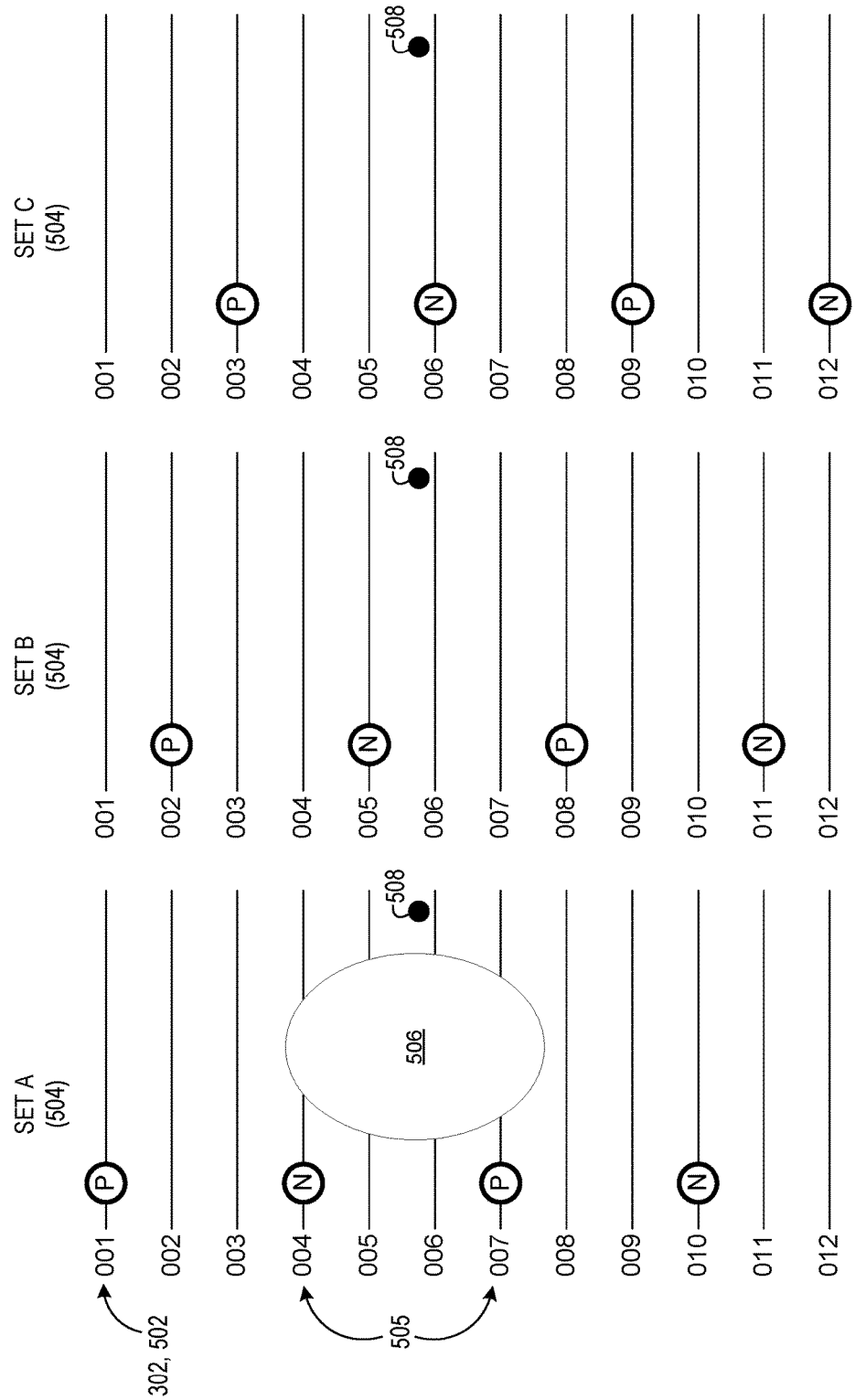
FIG. 5 shows different sets of sync-driven row electrodes that may be differentially driven in different stylus sync sub-frames to facilitate synchronization.

As will now be described, the compromising of stylus current may in some examples be improved by differentially driving sync-driven row electrodes in touch-sensing frames 400. In other words, within a given stylus sync sub-frame (SSSF) 402, drive logic 306 may use one synchronization waveform on some sync-driven row electrodes, and another, different, synchronization waveform on other sync-driven row electrodes. Any number and type of different synchronization waveforms may be used in a given stylus sync sub-frame (SSSF) 402. As described in detail below, the different synchronization waveforms are configured to create at least partially cancelling electrical conditions to reduce current flowing into a user's body that would undesirably affect synchronization current flowing into stylus electrode 322. FIG. 5 shows an example of such differential driving. The figure shows twelve row electrodes 302, as driven during three successive stylus sync sub-frames (SSSFs) 402. In this example, every nth electrode (n=3 here, but could be any other practicable number) is a sync-driven row electrode. One such sync-driven row electrode is indicated at 502 in the figure. Different sets of sync-driven row electrodes may be employed; three sets 504 are depicted. In the first stylus sync sub-frame, the set of sync-driven row electrodes (Set A) includes electrodes 001, 004, 007, 010. In the figure, sync-driven row electrodes 502 are distinguished from inactive row electrodes in that they are labeled with a synchronization waveform that is used on the electrode for synchronization (waveform labels in the figure are an encircled "P" and an encircled "N," to be explained). In Set B, the sync-driven row electrodes are rows 002, 005, 008, 011; in Set C, the sync-driven row electrodes are rows 003, 006, 009, 012. When referring to a "set" of sync-driven row electrodes 302, or "set information," this disclosure is referring to the specific row electrodes that are being driven during sync, and to the specific differential waveforms that are used for sync. In the example of FIG. 5, varied use of the three different sets cause the deployed waveforms to spatially shift in terms of row coordinate from frame to frame. This in turn, will cause the deployed respective waveforms to vary in distance to a given stylus contact point from frame to frame.

As mentioned above, different waveforms may be employed on the sync-driven row electrodes 502 in each set. Specifically, in any given stylus sync sub-frame (SSSF) 402, drive logic 306 (FIG. 2) may be configured to use two or more different waveforms on different sync-driven row electrodes for synchronization. In this example, reverse polarity waveforms are used (positive waveform indicated with an encircled "P" and negative waveform indicated with an encircled "N"). As shown in the figure, Sets A, B and C differ from one another in that the spatial distribution of sync-driven row electrodes, inactive row electrodes (i.e., not driven with synchronization waveforms) and specific synchronization waveforms are the same but shifted by one row electrode 302 from one set to the next. The different waveforms yield at least partially cancelling electrical conditions (e.g., when two inverse waveforms are close to one another) to reduce current flowing into the user's body and thereby avoid adverse impacts upon current flowing into the stylus electrode. In all three sets, a one-by-one alternating polarity scheme is employed, in which every sync-driven row electrode is driven with a synchronization waveform that is inverted with respect to that used on the adjacent sync-driven row electrodes.

Current reduction/cancellation into the user's body may be considered in terms of "spatial groupings" of sync-driven row electrodes. Referring to the first stylus sync sub-frame (Set A), the sync-driven row electrodes 502 may be grouped into various spatial groupings. One such spatial grouping is indicated at 505, and includes two sync-driven row electrodes 502 (rows 004 and 007). Two-row groupings may also be formed from the following sync-driven row electrode pairs in Set A: 001/004 and 007/010. Alternatively, a spatial grouping may include more than two row electrodes 302 (e.g., all four sync-driven row electrodes in Set A). Any practicable number of sync-driven row electrodes may comprise a spatial grouping.

When a user's body contacts display device 102, a contact patch may cover a spatial grouping of sync-driven row electrodes. Such a contact patch is shown at 506, and sits over spatial grouping 505 so as to overlap sync-driven row electrodes at rows 004 and 007. In many cases, the contact patch will cover a larger number of row electrodes 302; four electrodes, two of which are sync-driven row electrodes, are used here for clarity. As indicated above, a contact patch with significant electrode overlap can potentially produce a significant change in capacitance which can reduce current into a stylus tip. The opposite polarity waveforms on electrodes 004 and 007 may produce at least partially cancelling electrical conditions. This can reduce the current into the user's body, in some cases reducing it to zero, thereby avoiding some current reduction into the stylus electrode.

It will be appreciated that these partially cancelling conditions would occur in Sets A, B and C in the event of any contact patch overlapping any number of sync-driven row electrodes 302. Overlap of an even number of electrodes potentially would allow for greater cancellation, though even where an odd number of sync-driven row electrodes are overlapped, sufficient cancellation may be achieved. Typically, and as in the present example, a plurality of spatial groupings exist across the span of the matrix, each one including differentially driven sync-driven row electrodes, such that current into a user's body would be reduced relative to that which would occur if the same waveforms were used. In some examples, current-reducing spatial groupings may be sized based on an expected minimum size of a body contact patch. For example, the grouping may be sized based on a patch size that would provide a particular level of synchronization interference in the event of undifferentiated driving of sync-driven row electrodes.

It will be appreciated that any number, type and placement of different synchronization waveforms may be used within a spatial grouping/contact patch. The above example contemplates opposite polarity waveforms (e.g., binary pulse train), alternating at every other drive electrode. A different distribution might involve clustering of similar polarities (e.g., clusters of two or more positive waveforms spatially interleaved with clusters of two or more negative waveforms). More than two different waveforms may be employed. Digital waveforms taking on more than two values may be employed. Analog waveforms may be employed. Different frequencies, phases and amplitudes may be employed. In general, any synchronization waveform configuration may be used where the different waveforms under a body contact patch provide some cancellation to reduce into-body current.

In certain settings, synchronization performance may be affected by the spacing between sync-driven row electrodes. For example, a higher density of electrodes providing cancelling waveforms may more effectively provide cancellation for a variety of different size contact patches. A relatively high density would ensure, for example, that a sufficient number of varied waveforms are driven underneath an expected smallest contact patch, i.e., sufficient to achieve a desired level of cancellation. Additionally, a high-density scheme may decrease the number of sets of sync-driven row electrodes, thereby reducing the latency for the stylus gaining the shared sense of time.

Referring to the depiction of FIG. 5, a high-density scheme potentially could entail all twelve row electrodes 302 being sync-driven row electrodes, and altering one-by-one between positive "P" synchronization waveform and negative "N" synchronization waveform (e.g., even rows positive, odd rows negative). In such a case, for any given contact point of stylus electrode 322 on the matrix, the stylus tip would be close enough to both waveforms that they potentially would cancel/reduce current flowing into the stylus, thereby weakening the received synchronization signal.

Accordingly, in some cases it will be desirable to have an increased distance between sync-driven row electrodes, as in the every-nth example of FIG. 5. Therefore, when the stylus is close to a particular sync-driven row electrode, the distance to neighboring sync-driven row electrodes is sufficiently large so as to reduce the capacitance from the stylus tip to those electrodes. The stylus therefore receives a strong synchronization signal, without interference from synchronization waveforms on adjacent sync-driven row electrodes that would potentially reduce the strength of the synchronization signal.

Regardless of whether sync-driven row electrodes are closely or distantly spaced, it may be desirable to employ different sets of sync-driven row electrodes. When employed, the different sets may be configured so that, for any given point on an operative portion of a touch-sensing matrix, using at least one of the sets will cause a reduction in distance, to below a threshold, between such point and a closest sync-driven row electrode, relative to another set of the sync-driven row electrodes. For example, assuming a minimum desired threshold distance between a sync-driven row electrode 502 and where stylus electrode 322 is contacting matrix 300, different sync-driven row electrode sets may be employed so that at least one of them includes a sync-driven row electrode that will be within that threshold distance from the stylus electrode 322, to thereby provide a sufficiently strong signal with minimized interference from other synchronization waveforms. In other words, the different sets of sync-driven row electrodes may be constructed such that cycling through them causes frame-to-frame variation between a stylus contact point and a closest sync-driven row electrode.

Referring to point 508 on the matrix (e.g., a contact point where stylus electrode 322 might contact matrix 300), it will be seen that performance may vary between Sets A, B and C. Cycling through the sets from stylus sync sub-frame to the next causes the distance between point 508 and the closest sync-driven row electrodes to vary. As indicated above, it will normally be desirable that, for at least one of the sets, the stylus tip is relatively close to one sync-driven row electrode and relatively distant from any sync-driven row electrode that would produce cancellation (e.g., close to a one waveform and far from an inversion of that waveform). Referring specifically to FIG. 5, Set C provides the best performance in this regard. In Set A and Set B, the stylus electrode would be (1) either too far from the neighboring sync-driven row electrodes; and/or (2) the proximity to each sync-driven row electrode would be sufficient, but the nearby inverted waveforms would reduce the signal received by the stylus.

More generally, different sets of sync-driven row electrodes, and the differential waveforms used to drive them, may be used to provide, for a stylus electrode contact point on a matrix, varied positioning of the following relative to that contact point: (1) a synchronization waveform or waveforms that cause receipt of a synchronization signal into the stylus; and (2) a synchronization waveform or waveforms that counter the effect of (1). As indicated above, using different sets increases the potential that the distance of (1) will be relatively small while the distance of (2) will be relatively large.

Referring to the example of FIG. 5, drive logic 306 may selectively apply the different sets in any order over successive stylus sync sub-frames. In one example, the drive logic 306 cycles through them repeatedly in the same sequence: ABCABCABC etc. In other examples, the sets are chosen randomly. In other examples, only some of the sets are used over a given period of time, with some being omitted.

In other examples, sets of sync-driven row electrodes are chosen selectively, rather than cycling through them in a predetermined order, to achieve a performance benefit. In some cases, the benefit is as described above, namely placing a particular synchronization waveform close to the stylus electrode, while ensuring that interfering waveforms are farther away. Accordingly, the drive logic 306 may select from a plurality of different sets of sync-driven row electrodes based on position information associated with an active stylus.

Position information used for set selection may be stored in various places, for example as position information 330 in drive logic 306 (FIG. 3). With regard to stylus 320, position information 330 can take a wide variety of forms, including (1) current, past or predicted row and column coordinates of the stylus; (2) speed of stylus movement over past touch-sensing frames; (3) direction of stylus movement over past touch-sensing frames; (4) indicators affecting the ability to predict future position of the stylus; etc. In general, position information can include any type of information that may be useful in determining where stylus electrode 322 will be in a future touch-sensing frame. Position information may be performed in any suitable manner, including via the non-limiting examples described above, in which row drive sub-frames (RDSFs) 404 and stylus drive sub-frames (SDSFs) 406 (FIG. 4) are used to establish row coordinates and column coordinates for stylus 320.

When predictive-quality exceeds a threshold (e.g., relatively high confidence in future position of stylus), drive logic may enter a mode where sync-driven row electrode sets are chosen based on the position information. Referring again to the example of FIG. 5, if the system is able to predict, with sufficient accuracy, that the stylus electrode will be very close to point 508 in an upcoming touch-sensing frame, then drive logic 306 may employ Set C of sync-driven row electrodes for synchronization.

The drive logic may switch into and out of position-based selection. For example, prior to selecting based on position, the drive logic may be operating in a cycling mode, in which a defined sequence of sets is used, or a random cycling is used. These less-selective approaches may be employed when the system is not able to sufficiently assess whether one set will outperform another, in terms of its ability to effectively position synchronization waveforms around the stylus electrode. For example, if the stylus electrode is moving quickly, beyond a velocity threshold, then the drive logic may revert to a cycling mode (e.g., an ABCABCAB-CABC . . . set selection from FIG. 5). In addition to or instead of velocity thresholds, any type of threshold associated with the position information may be used to mode switch into and out of selecting sets of sync-driven row electrodes based on position information 330.

In typical implementations, receive logic, whether in matrix 300 or stylus 320, includes specific circuitry tuned to account for the properties of the excitation signal it receives. In some examples, receive processing is performed via correlation operations using a reference signal, which typically is based off of, and in many cases identical to, the excitation waveform. For example, if a synchronization waveform on a sync-driven row electrode is a 50% duty cycle square wave, a phase-aligned 50% duty cycle square wave may be used in receive circuitry for correlation purposes (e.g., in receive logic 326 of stylus 320). A high positive value in the correlation receiver indicates affirmative presence of the excitation signal. In the inversion examples mentioned above (one synchronization waveform is the inversion of the other), it will often be possible to use a single receiver (i.e., one reference waveform). In more complicated examples, multiple different receivers may be employed, one for each different excitation waveform.

The present disclosure does contemplate examples where multiple different waveforms are used in a set of sync-driven row electrodes. For example, given a minimum expected size of a body contact patch occurring anywhere on matrix 300, a set of sync-driven row electrodes might be constructed so that four different synchronization waveforms are positioned underneath the contact patch. The waveforms would be designed so that they collectively at least partially cancel one another, thereby reducing current into the user's body and maintaining current into stylus electrode 322. Use of this many waveforms may provide various benefits, though at the expense of configuring and operating four receivers within receive logic 326 of stylus 320.

In some circumstances in the above example, all four receivers must operate simultaneously. This might occur, for example, if the stylus does not know its row coordinate on the matrix. Not knowing that, the stylus cannot know what the nearby synchronization waveforms will be, and thus must attempt detection on all four of the different synchronization waveforms. On the other hand, the stylus may know its position, but not have knowledge of where the different synchronization waveforms will be placed along the row electrodes 302 of the matrix.

Accordingly, in some examples, operation of receive logic 326 in stylus 320 may be controlled based on position information (e.g., stylus coordinates) and set information for the sync-driven row electrodes (i.e., what row electrodes 302 will be activated and what synchronization waveforms will be used). For example, via some type of communication from matrix 300 (e.g., radio or electrostatic), or through another method, stylus 320 may learn of the various sets of sync-driven row electrodes that are employed. More specifically, the stylus may know that a particular set will be used in a specific upcoming touch-sensing frame, and that in that set, the row electrode 302 closest to its current position will be activated with a particular synchronization waveform. This may then enable the receive logic 326 to run only a receiver (e.g., correlation operation) particular to that synchronization waveform, instead of a less-targeted approach where multiple receivers are active. In other words, selective activation and deactivation of receivers may be based upon knowledge of the different sets of sync-driven row electrodes and which of such sets will be deployed by the drive logic during an upcoming stylus sync sub-frames.

Figure 6:
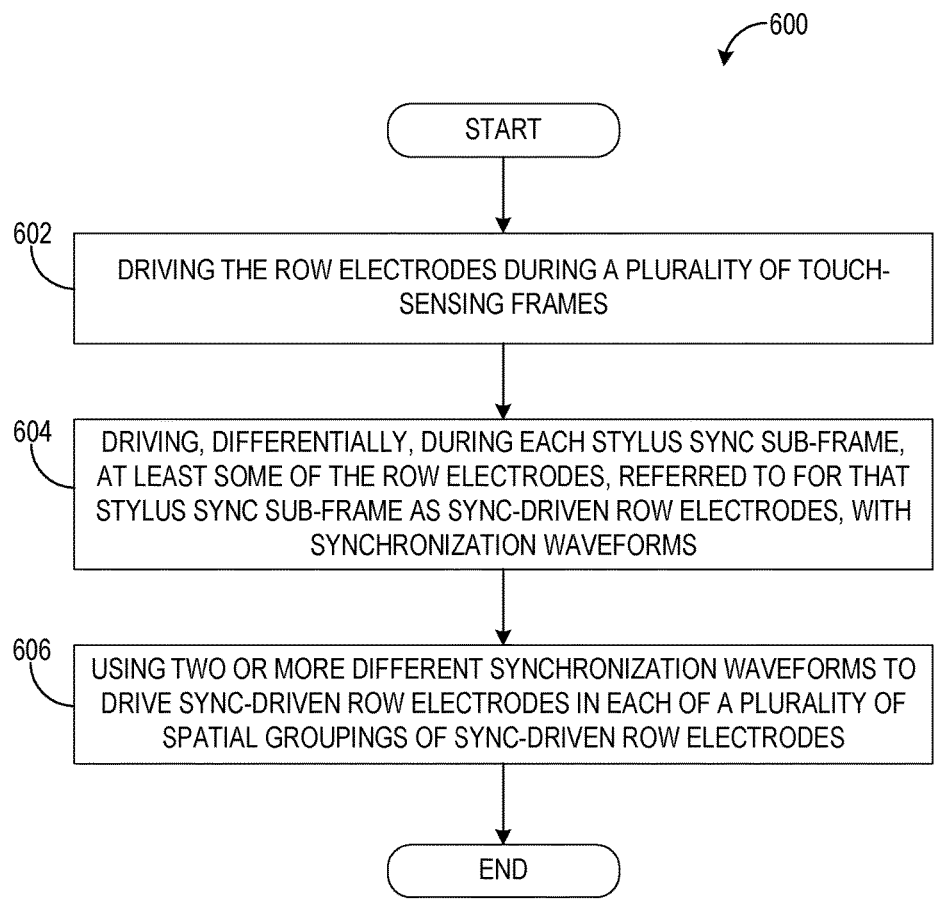
FIG. 6 shows an example touch-sensing method.

Referring now to FIG. 6, the figure depicts a touch-sensing method 600 for a display device having a touch sensor with a matrix of row electrodes and column electrodes. The method may be employed in connection with the systems shown in FIGS. 1-3, or with differently-configured systems. At 602, the method includes driving the row electrodes during a plurality of touch-sensing frames, e.g., in order to determine row/column coordinates of a user's finger and an active stylus. Each of the touch-sensing frames includes a stylus-sync sub-frame. At 604, the method includes driving, differentially, during each stylus sync sub-frame, at least some of the row electrodes, referred to for that stylus sync sub-frame as sync-driven row electrodes with synchronization waveforms. The synchronization waveforms are communicated electrostatically to an active stylus to synchronize the active stylus and the display device. The driving includes differentially driving the sync-driven row electrodes of the stylus sync sub-frame, such that a synchronization waveform used to drive one of the sync-driven row electrodes is different than a synchronization waveform used to drive another of the sync-driven row electrodes.

As shown at 606, the differential driving indicated at 604 may further include using two or more different synchronization waveforms to drive sync-driven row electrodes in each of a plurality of spatial groupings of sync-driven row electrodes. The two or more different synchronization waveforms may be configured to produce at least partially cancelling electrical conditions. This may reduce, in the event of a user's body part touching the display device on a contact patch over the spatial grouping of sync-driven row electrodes, current flowing into the user's body part, relative to current which would flow in the case of undifferentiated driving of the sync-driven row electrodes in the spatial grouping. In some examples, a spatial grouping may include synchronization waveforms of opposite polarity to provide cancellation, though this is but one example. Any size spatial groupings may be employed and, as described above, a wide range of different types and numbers of waveforms may be used to achieve cancelling electrical conditions. Such cancellation may, as described above, reduce current flowing into the user's body to avoid compromising current needed by the stylus for synchronization.

Method 600 may further include selecting from among a plurality of different sets of sync-driven row electrodes to use during stylus sync sub-frames. Typically, each set will omit some of the row electrodes of the matrix and will differ from the other sets (e.g., a row electrode is sync-driven for one set and not for another). In some cases, the sets may be constructed so that, for any given point on an operative portion of the matrix (i.e., a stylus contact point), using the different sets causes variation of distance between the closest sync-driven row electrode and the stylus contact point. Typically, one of the sets will cause a reduction in distance between the stylus contact point and a closest sync-driven row electrode, relative to another set of the sync-driven row electrodes. The sets may be constructed so that this is below a threshold distance to provide desired synchronization signal strength to the stylus. The method may also include selecting from among the different sets based on position information associated with the active stylus. In one example, a set is selected to place a sync-driven row electrode as close as possible to the current row coordinate of the stylus, to thereby improve the strength of the synchronization signal. A variety of other position-based selections may be employed, as described above with reference to FIGS. 3 and 5.

The approaches described above for increasing the strength of electrostatic signals transmitted to a stylus electrode may be applicable to capacitive touch sensors other than those described above. For example, differential waveforms may be utilized in so-called "in-cell" touch sensor matrices, in addition to so-called "mutual capacitance" touch sensor matrices, of which touch sensor matrix 300 of FIG. 3 may be considered an example. It will be appreciated that, in FIG. 3, "matrix" refers to, among other things, the intersections between the elongate transmitting and receiving row/column electrodes, where mutual capacitance is measured at those intersections via transmitting on one electrode and receiving on the other. In the in-cell and on-cell examples below, "matrix" refers also to an array of locations where capacitance is measured (and/or the electrodes themselves), but the measurement locations instead are individual electrodes (instead of electrode intersections), with self-capacitance measurements occurring by both transmitting and receiving at each electrode to establish, for example, x/y location of finger touch on the matrix. It will further be appreciated that in-cell display implementations are but one example setting in which the to-be-described self-capacitance methods may be employed.

Figure 7:
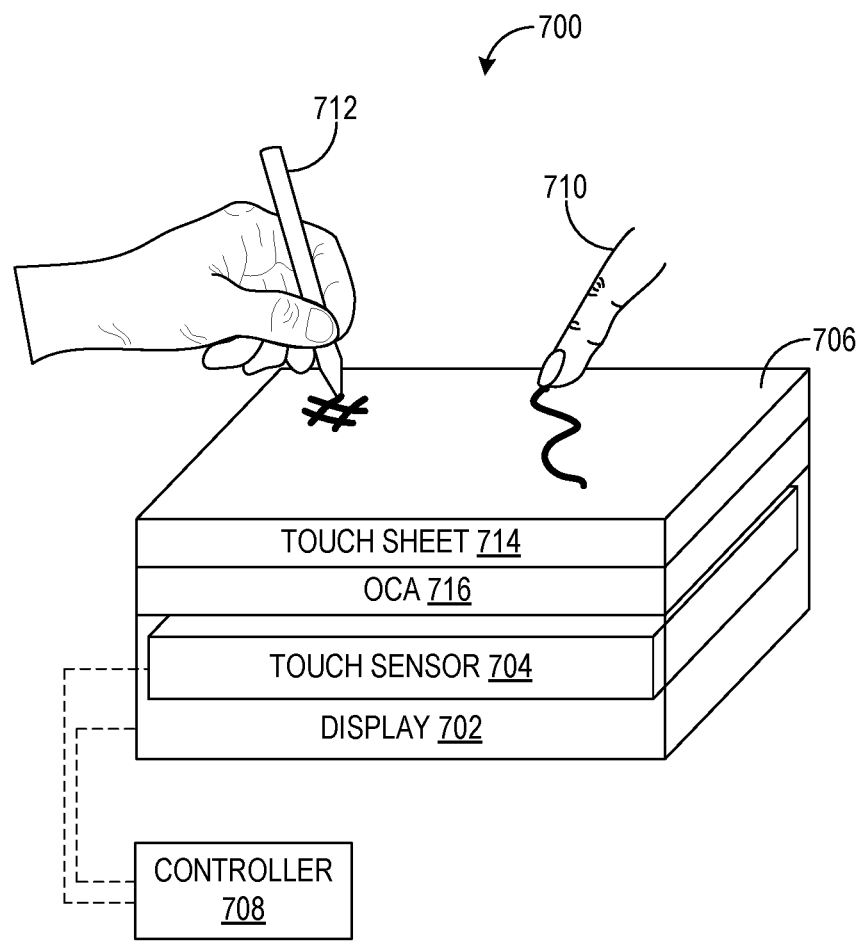
FIG. 7 shows an example touch-sensitive display device.

FIG. 7 shows an example touch-sensitive display device 700, including a display 702 and a touch sensor 704 to enable graphical output and touch input (e.g., from a stylus or finger). Display 702 is operable to emit light in an upward direction to yield viewable imagery at a top surface 706 of the display device or other locations. Display 702 may assume the form of a liquid crystal display (LCD), organic light-emitting diode display (OLED), or any other suitable display. To effect display operation, FIG. 7 shows display 702 coupled to a controller 708, which may control pixel operation, refresh rate, drive electronics, operation of a backlight if included, and/or other aspects of the display. A suitable image source, which may be integrated with, or provided separately from, controller 708, may provide graphical content for output by display 702. The image source may be a computing device external to, or integrated within, display device 700, for example.

Touch sensor 704 is operable to receive input, which may assume various suitable form(s). As examples, touch sensor 704 and associated componentry may detect (1) touch input applied by a human digit 710 in contact with top surface 706 of display device 700; (2) a force and/or pressure applied by the human digit to the top surface; (3) hover input associated with a human digit near but not in contact with top surface 706; (4) a height of the hovering human digit from the top surface, such that a substantially continuous range of heights from the top surface can be determined; and/or (5) input from a non-digit input device such as an active stylus 712. As described in further detail below, touch sensor 704 may receive position, tip force, button state, and/or other information from stylus 712, and in some examples may transmit information to the stylus. Touch sensor 704 may be operable to receive input from multiple input devices (e.g., digits, styluses, other input devices) simultaneously, in which case display device may be referred to as a "multi-touch" display device. To enable input reception, touch sensor 704 may be configured to detect changes associated with the capacitance of a plurality of electrodes, as described in further detail below.

Inputs received by touch sensor 704 are operable to affect any suitable aspect of display 702 and/or a computing device operatively coupled to display device 700, and may include two or three-dimensional finger inputs and/or gestures. As an example, FIG. 7 depicts the output of graphical content by display 702 in spatial correspondence with paths traced out by digit 710 and stylus 712 proximate to top surface 706. While FIG. 7 shows controller 708 as effecting operation of both display 702 and touch sensor 704 (e.g., electrode drive/receive operation), separate display and touch sensor controllers may be provided.

Display device 700 may be implemented in a variety of forms. For example, display device 700 may be implemented as a so-called "large-format" display device with a diagonal dimension of approximately 1 meter or greater, or in a mobile device (e.g., tablet, smartphone) with a diagonal dimension on the order of inches. Other suitable forms are contemplated, including but not limited to desktop display monitors, high-definition television screens, tablet devices, etc.

Display device 700 may include other components in addition to display 702 and touch sensor 704. As an example, FIG. 7 shows the inclusion of an optically clear touch sheet 714 providing top surface 706 for receiving touch input as described above. Touch sheet 714 may be comprised of any suitable materials, such as glass or plastic. Further, an optically clear adhesive (OCA) 716 bonds a bottom surface of touch sheet 714 to a top surface of display 702. As used herein, "optically clear adhesive" refers to a class of adhesives that transmit substantially all (e.g., about 99%) of incident visible light. Alternatively or additionally, display device 700 may include any suitable components not shown in FIG. 7, including but not limited to various optical elements (e.g., lens, diffuser, diffractive optical element, waveguide, filter, polarizer).

FIG. 7 depicts the integration of touch sensor 704 within display 702 in a so-called "in-cell" touch sensor implementation. In this example, one or more components of display device 700 may be operated to perform both display output and input sensing functions. As a particular example in which a display 702 is an LCD, the same physical electrode structures may be used both for capacitive sensing and for determining the field in the liquid crystal material that rotates polarization to form a displayed image. Alternative or additional components of display device 700 may be employed for display and input sensing functions, however.

Other touch sensor configurations are possible. For example, touch sensor 704 may alternatively be implemented in a so-called "on-cell" configuration, in which the touch sensor is disposed directly on display 702. In an example on-cell configuration, touch sensing electrodes may be arranged on a color filter substrate of display 702. Implementations in which touch sensor 704 is configured neither as an in-cell nor on-cell sensor are possible, however. In such implementations, an optically clear adhesive (OCA) may be interposed between display 702 and touch sensor 704, for example.

Touch sensor 704 may be configured in various structural forms and for different modes of capacitive sensing. In a self-capacitance mode, the capacitance and/or other electrical properties (e.g., voltage, charge) between touch sensing electrodes and ground may be measured to detect inputs. In other words, properties of the electrode itself are measured, rather than in relation to another electrode in the capacitance measuring system. Additional detail regarding self-capacitance touch sensing is described below with reference to FIG. 8, which shows an example self-capacitance touch sensor that can be implemented in an in-cell or on-cell fashion.

In a mutual capacitance mode, the capacitance and/or other electrical properties between electrodes of differing electrical state may be measured to detect inputs. When configured for mutual capacitance sensing, and similar to the above examples, touch sensor 704 may include a plurality of vertically separated row and column electrodes that form capacitive, plate-like nodes at row/column intersections when the touch sensor is driven. The capacitance and/or other electrical properties of the nodes can be measured to detect inputs.

Touch sensor 704 may include a plurality of electrodes that are configured to detect input in response to applied drive signals. In some cases, the drive signals are applied at the same electrode(s) at which the capacitance measurements are made. In other cases, the drive signals are applied at one or more electrodes near the receiving electrode. The electrodes may assume a variety of suitable forms, including but not limited to (1) elongate traces, as in row/column electrode configurations, where the rows and columns are arranged at substantially perpendicular or oblique angles to one another; (2) substantially contiguous pads, as in mutual capacitance configurations in which the pads are arranged in a substantially common plane and partitioned into drive and receive electrode sets, or as in in-cell or on-cell configurations; (3) meshes; and (4) an array of point electrodes arranged at specific x/y locations, as in in-cell or on-cell configurations.

In some scenarios, touch sensor 704 may identify the presence of an input mechanism by driving at least a set of electrodes, and analyzing output resulting from such driving at the same or different set of electrodes. For mutual capacitance implementations, a drive signal (also referred to herein as an "excitation waveform") such as a time-varying voltage may be applied to a first set electrodes (e.g., "drive" electrodes), thus influencing an output signal at a second set of electrodes (e.g., "receive" electrodes). The presence of an input mechanism may then be ascertained by analyzing the output signal as described below.

For self-capacitance implementations, one or more electrode characteristics may be analyzed to identify the presence of an input mechanism. Typically, this is implemented via driving an electrode with a drive signal, and observing the electrical behavior with receive circuitry attached to the electrode. For example, charge accumulation at the electrodes resulting from drive signal application can be analyzed to ascertain the presence of the input mechanism as described below. In these example methods, input mechanisms of the types that influence measurable properties of electrodes can be identified, such as human digits, which may affect electrode conditions by providing a capacitive path to ground for electromagnetic fields. Other methods may be used to identify different input mechanism types, such as those with active electronics.

In both mutual and self-capacitance implementations, touch sensor 704 may employ a correlation-based approach in analyzing output signals to perform input mechanism detection, among other potential tasks. In this approach, a given output signal may be correlated with one or more reference sequences using a suitable correlation operation (e.g., cross-correlation) to obtain correlated output with a sufficient signal-to-noise ratio. The correlation operation may yield a number that can be compared to a threshold such that, if the number meets or exceeds the threshold, touch sensor 704 determines that an input mechanism is present, and if the number falls below the threshold, the touch sensor determines that an input mechanism is not present. In some examples, a drive signal used to drive electrodes may form the basis for a reference sequence. Further, one or more reference sequences may be designed to mitigate noise for certain operating conditions, noise sources, and/or wavelength bands.

FIG. 8 shows an example touch sensor 800. Touch sensor 800 includes a plurality of electrodes, such as electrode 802, which are configured to receive, via capacitance measurements, input in one or more of the forms described above—e.g., touch, hover, force/pressure, and/or stylus/active input device. FIG. 8 is described in the context of an in-cell implementation, in which touch sensor 800 is configured as an in-cell sensor in combination with a display as described above. As such, touch sensor 800 may be touch sensor 704 of touch-sensitive display device 700, both of FIG. 7.

However, touch sensor 800 may be implemented as an on-cell touch sensor, or as neither an in-cell nor on-cell sensor that is discrete and separate from a display. For in-cell and on-cell implementations, the plurality of electrodes is referred to herein as a plurality of "sensels".

To enable sensel charging and the reception of resulting output, the sensels are operatively coupled to drive logic 804 and receive logic 806. One or both of the drive logic and receive logic may be implemented into a controller, such as controller 708 of FIG. 7. Via drive logic 804, each sensel may be selectively driven with one or more drive signals, and, via receive logic 806, one or more electrical characteristics (e.g., capacitance, voltage, charge) of the sensels influenced by such driving are monitored to perform input sensing. Input sensing may also be performed at the sensels in response to drive signals applied from an active stylus, such as active stylus 712. Receive logic 806 may perform correlation operations to perform sensing, as described above with reference to FIG. 7. In one example, output from a given sensel may be used in a correlation operation after charging of the sensel for an integer number of iterations in an integration period. Alternatively or additionally, the sensel may be continuously monitored during charging and/or discharging. In either case, self-capacitance of the plurality of sensels is measured for input sensing.

Due to the relatively large number of sensels included in a typical implementation of touch sensor 800, a limited number of sensels are shown in FIG. 8 for simplicity/clarity. Examples described below contemplate a particular configuration in which touch sensor 800 includes 20,000 sensels—e.g., when implemented in a large-format display device. Touch sensor 800 may include any suitable number of sensels, however.

In an example such as that referenced above with 20,000 sensels, the sensels may be arranged in 100 rows and 200 columns. While it may be desirable to maximize sensing frequency by simultaneously measuring capacitance at each sensel, this would entail provision of significant processing and hardware resources. In particular, 20,000 receivers (e.g., analog-to-digital converters) in receive logic 806 would be needed to perform full-granularity, simultaneous self-capacitance measurements at each sensel. As such, partial-granularity, multiplexed approaches to self-capacitance measurement may be desired to reduce the volume of receive logic 806. Specifically, as described below, receive logic capable of servicing only a portion of the touch sensor at one time may be successively connected to different portions of the touch sensor over the course of a touch frame, via time multiplexing, in order to service the entire touch sensor.

FIG. 8 illustrates one example approach to partial-granularity self-capacitance measurement in touch sensor 800. In this approach, the sensels are grouped into horizontal bands 810A-810J, each having ten rows of sensels. In this approach, self-capacitance measurements are temporally multiplexed via a multiplexer 812, with a respective measurement time slot in a touch frame being allocated for each band 810. Accordingly, receive logic 806 may include a number of receivers equal to the number of sensels in a given band 810—e.g., 2,000 receivers. For example, the receivers may be connected to one band in a first time slot, then to another in the next time slot, and so on. It will be appreciated that the above groupings, bands, number of sensels, etc. reflect but one of many possible implementations. Different numbers of sensels may be employed; shapes and arrangements of groupings may differ from the depicted example; etc.

Touch sensor 800 may employ a variety of drive modes to effect sensel operation. In one drive mode, all sensels may be driven to perform input sensing, which may simplify drive logic 804. It may be desirable to employ such an approach even when only a portion of the touch sensor is read at any given time, as in the multiplexing scheme described above. Drive logic 804 may apply a single drive signal during a drive mode, differing drive signals during the drive mode, or may employ multiple drive modes with differing drive signals. Further, drive logic 804 may switch among two or more drive modes to alter input mechanism detection and/or to facilitate communication with an active input mechanism such as a stylus. "Drive mode" may also refer to periods in which one or more sensels are not driven but instead are receiving input from driven electrodes of an active stylus, as described elsewhere in more detail.

In some implementations, touch sensor 800 may be selectively operated in a "full search" mode and a "local search mode." Full search refers to operations, within the course of a single touch-sensing frame, that cause the entirety of the touch sensor to be scanned for inputs. In some examples, the touch sensor is placed into full search mode during multiple different intervals to scan the entire sensor. For example, in the banded approach described above, ten different intervals could be used for full search, that is, full search mode would be employed during ten different sub-frames of the touch-sensing frame. During each full search mode interval, one of the ten bands would be scanned. Still further, two or more full search intervals could be allocated for each of the ten bands, thus resulting in twenty or more full search intervals.

Local search refers to performing an operation for only a portion of the touch sensor in a given touch-sensing frame. In other words, for a given touch-sensing frame, the operation is localized to a specific location (or locations) on the touch sensor, and the operation is not performed during that frame for the remainder of the touch sensor. In one example, as will be discussed in detail below, full search mode is used to scan the entire touch sensor for inputs, with local search being employed in the touch-sensing frame only in a region where an active stylus is detected (e.g., to receive electrostatic communication of pressure values from the stylus).

Referring again to full search, and in the context of the time multiplexing of receive logic 806, full search mode intervals may be used successively for each band 810 in each touch-sensing frame. Thus, in each touch-sensing frame, the full search periods collectively enable detection of finger touches and other input mechanisms, such as an active or passive stylus, across the entire touch sensor.

In some examples, a local search period or periods may be performed to receive stylus state information from an active stylus at touch sensor 800. The stylus state information may include information regarding battery level, firmware version, tip force/pressure values, and/or button state, among other potential data. In typical implementations, this local search activity also informs/confirms stylus position, since the strongest signals on the touch sensor will occur at the x/y stylus location. During full search, some stylus location functionality may also occur—e.g., the stylus sending a locating drive signal indicating a band 810 of touch sensor 800 that corresponds to the active stylus location. As such, the indication of a band 810 corresponding to the active stylus location may prompt a subsequent local search in that band to thereby receive stylus state information from the stylus and potentially a confirmation or further pinpointing of stylus location.

Touch sensor 800 may perform multiple local searches in a single touch frame to receive stylus state information at multiple times within the touch frame. In this way, an increased frequency of receiving stylus state information may reduce the latency of active stylus operation. Other uses for local searching are possible. For implementations in which full search reveals an indeterminate location of the active stylus, such as a band 810 and not a particular x/y location, a local search may be performed following a rough position determination via a full search, to resolve location to a desired degree of accuracy. This scheme may be desirable in terms of time efficiency. Specifically, to achieve a high overall frame rate in an active stylus implementation, it may be desirable to conduct the full search periods at a speed that does not allow for full resolution of stylus position. Targeted work is then done at a specific location (local search) to pinpoint stylus location.

Referring to active stylus 814, the stylus includes electrode tip 820 through which signals can be transmitted (e.g., electrostatically) to and/or received from touch sensor 800 (in combination with suitable drive logic and a power source not shown in FIG. 8). Stylus 814 may include one or more additional electrodes for various purposes, for example to enable enhanced information about stylus position. In some examples, stylus 814 transmits a drive signal to touch sensor 800 to enable location sensing of the stylus during full search periods. Typically, this drive signal is selected so that the receive logic 806 can distinguish stylus inputs from finger inputs. In some examples, the stylus electrode drive signal is selected so that the receive logic sees an output similar to that produced by a finger, but opposite in polarity. This can simplify the receive circuitry in some cases while still allowing simultaneous sensing of stylus and finger inputs.

Generally, electrostatic interaction between stylus 814 and touch sensor 800 can be used to (1) determine the location of the stylus relative to the touch sensor; (2) send/receive synchronization signals to establish/maintain a shared sense of time between the stylus and the touch sensor; (3) communicate state/status between the stylus and display such as identifiers, stylus button state, battery level and the like; and/or (4) transmit various other data, such as force determined in the stylus tip, firmware updates, encryption keys/information, time at which various events occur, etc. While not shown in FIG. 8, touch sensor 800 and stylus 814 may include components configured to enable radio communication therebetween, which may perform one or more of the functions described above and/or other functions.

As mentioned above, one or more synchronization periods may be employed to enable temporal synchronization between touch sensor 800 and stylus 814. Any synchronization period within a touch-sensing frame shall be referred to herein as a "stylus sync sub-frame", and sensels driven as a part of the sync-frame are referred to herein as "sync-driven" sensels or electrodes.

To illustrate the use of full searches, local searches, and synchronization periods, FIG. 9 shows an example touch-sensing frame 900 according to which touch sensor 800 may be operated. Touch-sensing frame 900 begins with a stylus synchronization sub-frame 902 in which touch sensor 800 transmits a synchronization beacon to stylus 814. However, one or more synchronization beacons maybe employed at different locations within the touch-sensing frame. When the stylus is in range, it receives the synchronization beacon and thereby synchronizes timing with the display, which, due to the designed communication protocol, enables the stylus to know the exact timing of all of the sub-frames of touch-sensing frame 900. Sync sub-frame 902 is followed by a full search sub-frame 904A. Full search sub-frame 904A is denoted in FIG. 9 as $FS(band_A)$, indicating that, while all sensels of touch sensor 800 may be driven during the full search sub-frame, output reception and input sensing is limited to band 810A due to the multiplexing of receive logic 806 to the sensels of that band. In this example, results from the full search sub-frame 904A indicate the presence/location of stylus 814 in a band 810N. As such, full search sub-frame 904A is followed by a local search sub-frame 906A, denoted in FIG. 9 as $LS(band_N)$, indicating local searching in the band 810N identified by full search sub-frame 904A.

As described above, local search sub-frame 906A may be allocated for receiving data from stylus 814, such as data relating to battery level, identification information, button state, force at electrode tip 820, and/or other stylus data described above. As local searches in general may be allocated for receiving stylus data beyond the approximately locating drive signal, it is desirable for touch sensor 800 to identify the particular band 810 in which stylus 814 is located. To this end, stylus 814 may transmit the approximately locating drive signal described above during portions of full searches (and/or potentially portions of local searches—e.g., during times other than those at which stylus data beyond the drive signal is transmitted).

FIG. 9 also depicts additional full search sub-frames interspersed with local search sub-frames centered on the bands where the stylus is found as a result of the full search intervals. As depicted, the intervals are as follows in sequence:

(1) a full search sub-frame 904B in band 810B;
(2) a local search sub-frame 906B at the stylus's band location;
(3) a full search sub-frame 904C in band 810C;
(4) a local search sub-frame 906C at the stylus's band location;
(5) a full search sub-frame 904D in band 810D; and
(6) a local search sub-frame 906D at the stylus's band location;

In the depicted example, the above sequence would continue through to band 810J for each touch-sensing frame 900. From the above, it will be understood that the band 810 multiplexed to receive logic 806 may vary between full and local search sub-frames—e.g., the band 810 at which a local search is performed may differ from the band investigated during the immediately preceding full search interval.

The execution of full searches in each of bands 810A-J may be considered a complete touch-sensing frame. Thus, in the depicted example, the full search intervals identify finger touch inputs and active stylus location over the entire panel. The local search intervals may enable other interaction such as communication of data from the stylus to the touch sensor/display.

Touch sensor 800 and/or stylus 814 may vary the number, inclusion, sequence, structure, duration, etc. of the various sub-frames on a frame-to-frame basis, based on operation conditions and/or other factors. For example, signal-to-noise conditions may influence adjustments to the duration of various sub-frames. In another example, local search intervals may be omitted from the touch-sensing frame when the stylus is not present and interacting with the display, thus increasing the frame rate for sensing finger touch. The specific application being controlled by touch input may influence dynamic adjustment to the configuration of the touch-sensing frame. These and other potential adjustments may be made to minimize the duration of input sensing and maximize frame rate to enhance performance.

As described above, a single band 810 identified by a full search may be selected for subsequent local searching. However, relatively rapid full searching may reduce uncertainty to a point where two or more bands must be searched locally. For example, local searching may additionally be performed in one or more bands adjacent a band in which the input mechanism location is most strongly suspected. The selection of multiple bands 810 may be desired even if the input mechanism location can be sufficiently narrowed to a single band, e.g., to accommodate the potential for rapid stylus movement over the tough sensor surface. Searching multiple bands requires additional time and it may therefore be desirable to enhance estimations of stylus location via use of motion data.

Specifically, in one example, location data for an input mechanism may be updated for each frame of touch sensor 800. Historical location data may be used to determine a stylus motion vector to future location of the stylus, which may or may not correspond to the location which would be identified absent the motion data (i.e., using only the most recent snapshot of stylus location). Motion prediction along these lines may potentially limit the need to query multiple bands during local search intervals of the touch-sensing frame.

As described above, drive logic 804 may apply a common drive signal to the plurality of sensels. One issue potentially associated with the application of a common drive signal to the plurality of sensels is the insufficient transmission of signals from touch sensor 800 to stylus 814. For example, insufficient signal transmission may occur in the case of a user being capacitively coupled to touch sensor 800 and poorly grounded (e.g., by placing a body part in contact with a display device in which the sensor is housed). The diminished signal transmission to stylus 814 may be worsened in some cases as the contact patch between the user and display device increases. Thus, a similar issue may arise from the use of the common drive signal in touch sensor 800 as in touch sensor matrix 300 of FIG. 3. Synchronization in particular may be affected when insufficient current flows into the stylus tip electrode 820.

To address the issues described above in connection with the use of a common, undifferentiated, drive signal, drive logic 804 may apply differential excitation waveforms to at least a set of the sensels. To this end, FIG. 10 shows an example sensel grouping 1000 that may be implemented in touch sensor 800. In grouping 1000, the sensels are arranged in rectangular sets that alternate with respect to excitation waveforms in both the row and column directions. For example, a first excitation waveform (represented by diagonal shading) is applied to a first set 1002A, whereas a second excitation waveform (represented by a lack of shading) is applied to a second set 1002B and a third set 1002C, which are adjacent to the first set in the row and column directions, respectively. Grouping 1000, and the other groupings shown in FIGS. 10 and 11, generally represent example spatial arrangements of sensels that may be employed with the use of differential waveforms in an in-cell touch sensor. The sensel sets included in a spatial sensel grouping may include any suitable number of individual sensels—e.g., a single sensel; two or more sensels; tens, hundreds, or thousands of sensels; all sensels within a given column section of a band 810, such that the number of rows within the sensel set is equal to the number of sensel rows in that band. With reference to touch sensor 800, the sensel sets shown in FIGS. 10 and 11 may cover the entire touch sensor, or in other examples may cover merely a portion of the touch sensor, in which case the sets and/or groupings may be at least partially repeated. Sensel numbers in a given sensel set may be equal or unequal in the row and column directions, and set numbers in a given spatial grouping may be equal or unequal. Rectangular, Euclidean, non-Euclidean, and/or other geometries may be employed in arranging sensels, sensel sets, and spatial groupings of sensels. Further, sensel sets and/or spatial groupings of sensel sets may be chosen as a function of an expected contact patch (e.g., minimum size) of an input mechanism, such as the contact patch of a human digit or heel of a human palm.

As additional examples, FIG. 10 shows spatial groupings 1004 and 1006. In spatial grouping 1004, the first excitation waveform is applied to a first set 1004A, and the second excitation waveform is applied to a second set 1004B adjacent to the first set in the column direction. In spatial grouping 1006, the first excitation waveform is applied to a first set 1006A, and the second excitation waveform is applied to a second set 1006B adjacent to the first set in the row direction. It will be understood that the designation between "row" and "column" is arbitrary in that the row and column directions described herein can be reversed, such that the row direction (e.g., horizontal direction) becomes the column direction (e.g., vertical direction) and the column direction becomes the row direction. In the sensel groupings shown in FIGS. 10 and 11, for example, the row/column directions can be reversed such that the spatial alternation between waveforms also reverses with respect to the row/column directions.

The first and second excitation waveforms may assume any suitable form. In some examples, the first excitation waveform may be a substantial inverse of the second excitation waveform to enable at least partial cancellation of current flowing into a user's body, as described above. Further, three or more excitation waveforms, at least partially cancelling each other and/or to varying degrees, may be employed with the groupings shown in FIGS. 10 and 11. Still further, the excitation waveform applied to a given grouping may be alternated over time. Generally, the groupings described herein may be configured or modified to support any suitable set of excitation waveforms, which may include any suitable number, type, and/or spatial arrangement of waveforms across the sensels. In this way, the current flowing into a user's body part capacitively coupled to touch sensor 800 may be reduced as compared to non-differential driving schemes, thus ensuring desired current flow into stylus electrode(s).

Figure 11:
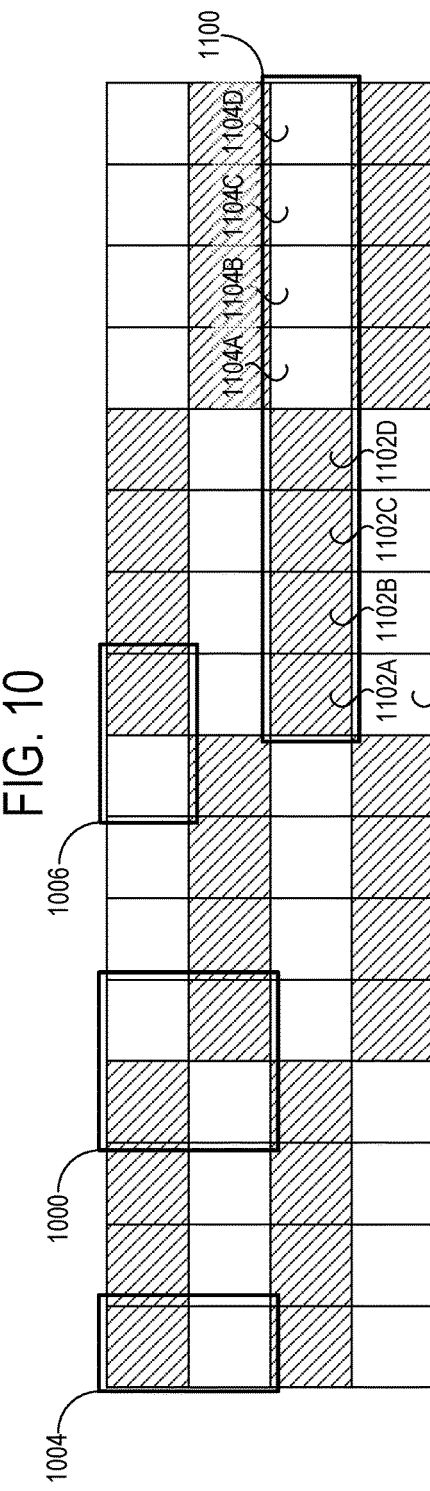
FIG. 11 shows another example sensel grouping.

As another example, FIG. 11 shows an example sensel grouping 1100 that may be implemented in touch sensor 800. In grouping 1100, the sensels are arranged in rectangular sets that alternate with respect to excitation waveforms in successive sets of four in the row direction, and alternate back-to-back in the column direction. For example, a first excitation waveform (represented by diagonal shading) is applied to a successive set of four sets 1102A-D, whereas a second excitation waveform (represented by a lack of shading) is applied to a successive set of four sets 1104A-D following the four sets 1102A-D in the row direction. The second excitation waveform is applied to a set 1106A adjacent to the set 1102A. As described above with reference to FIG. 10, the first and second excitation waveforms may be substantial inverses, and in some examples three or more excitation waveforms may be employed with grouping 1100. Further, the excitation waveform applied to one or more sets in grouping 1100 may be alternated over time (e.g., frame-to-frame to provide varying performance at a given location, as discussed with reference to FIG. 5). Generally, grouping 1100 may be configured or modified to support any suitable set of excitation waveforms, which may include any suitable number, type, and/or spatial arrangement of waveforms across the sensels. In this way, the current flowing into a user's body part capacitively coupled to touch sensor 800 may be reduced as compared to non-differential driving schemes, such that desired current flow into stylus electrode(s) is enabled. FIG. 11 also shows the application of spatial groupings 1000, 1004, and 1006 relative to the differential driving scheme shown therein.

Attributes of groupings may be varied over time, including but not limited to grouping number, sensel number, and grouping geometry, as described above. In some examples, a set of sensels, and not all of the sensels of a touch sensor, may be driven at any given time. The set of driven sensels may be varied over time. Further, the approaches described above for reducing the attenuation of capacitive communication between a stylus and in-cell touch sensor may be applied to any suitable type of signal transmission, including stylus synchronization signals as well as non-synchronization signals. Generally, differential driving of an in-cell touch sensor may be employed during scenarios in which capacitive communication with a stylus may be adversely affected by the presence of a user's body.

Drive logic 804 may be configured to enable the selected grouping applied to touch sensor 800. For example, the sensels in each spatial grouping set may be commonly coupled to drive logic 804 and isolated from other sets to enable the selective driving of each set in the spatial groupings. Similarly common couplings may be employed to achieve other groupings. In yet other examples, one or more (e.g., all) of the sensels may be individually coupled to drive logic 804 to enable each sensel to be uniquely and selectively driven, which may afford greater flexibility in the selection of sensel groupings. In some examples in which partial-granularity self-capacitance measurement is employed as described above, the number of rows in each grouping set may be equal to the number of rows in each horizontal band.

Drive logic 804 may select a spatial grouping to achieve a distance between the location of stylus 814 and a closest driven sensel that is below a threshold distance. For example, assuming a minimum desired threshold distance between a driven sensel and stylus 814 contact point on touch sensor 800, different spatial groupings may be employed so that at least one grouping includes a driven sensel (or sensel set) that is within the threshold distance from the stylus contact point, to thereby provide a sufficiently strong signal with minimized interference from other waveforms. In other words, the different spatial groupings may be constructed such that cycling through the groupings causes frame-to-frame variation between a stylus contact point and a closest driven sensel. Further, drive logic 804 may select a spatial grouping, sensel set, or any other hierarchical arrangement of sensels for alternative or additional purposes (e.g., to minimize signal attenuation, increase SNR of stylus communication, increase SNR of sensing, reduce power consumption). In some examples, stylus 814 may include receive logic configured to selectively activate and deactivate multiple different receivers within the receive logic based on knowledge of differential synchronization forms to be deployed by drive logic 814 during an upcoming stylus sync sub-frame. For example, the stylus receive logic may have knowledge of one or more of a spatial grouping of sensels, sensel set, or other hierarchical arrangement of sensels to be used by touch sensor 800.

The following example spatial sensel groupings are further contemplated: (1) a grouping alternating between first and second excitation waveforms in the diagonal direction, (2) successive sets of five (or any other suitable integer number) sensel sets alternating between first and second excitation waveforms in the row direction, (3) sets that alternate in one of the row/column directions and not in the other of the row/column directions, (4) sets that alternate in some regions of touch sensor 800 but not in others, and (5) sets in which only some, and not all, of the sensels in the set are differentially driven (e.g., the non-differentially driven sensels are not driven).

Figure 12:
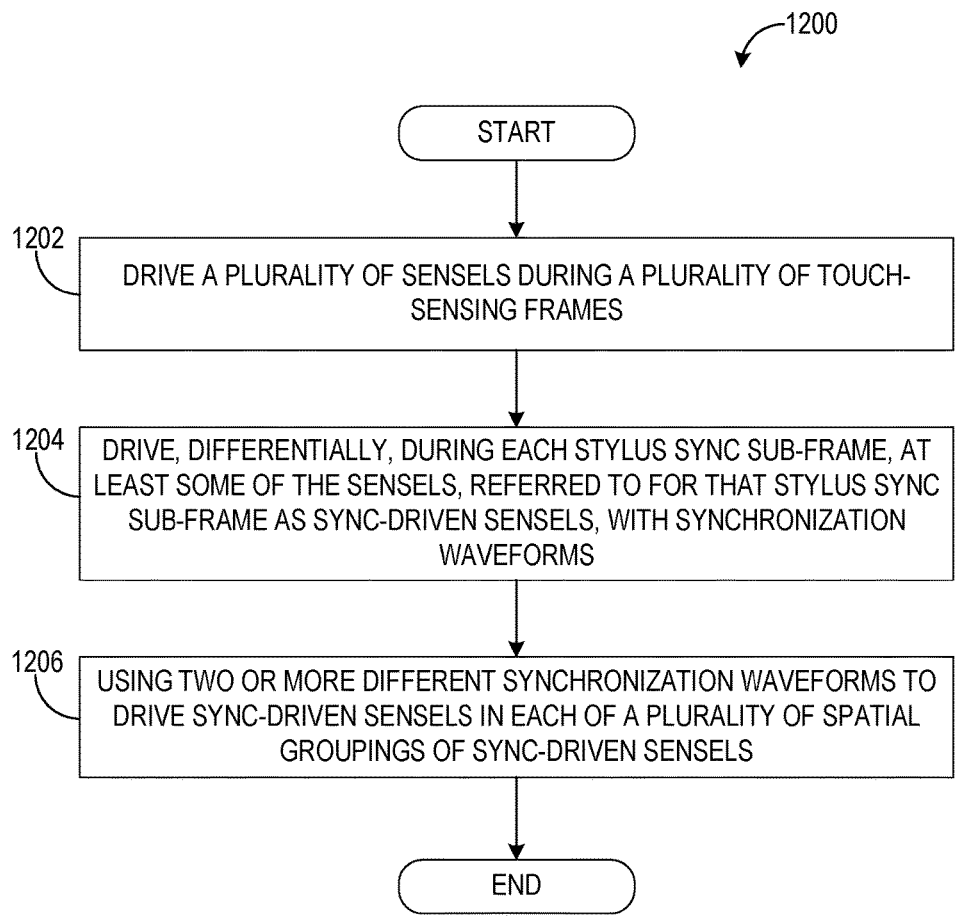
FIG. 12 shows another example-touch sensing method.

FIG. 12 shows a flowchart illustrating an example touch-sensing method 1200 for a display device having a touch sensor with a plurality of electrodes. The plurality of electrodes may be a plurality of sensels. Method 1200 may be executed on touch sensor 800 of FIG. 8, for example.

At 1202, method 1200 includes driving the plurality of electrodes during a plurality of touch-sensing frames, e.g., in order to determine x/y coordinates of a user's finger and an active stylus. Each of the touch-sensing frames includes a stylus-sync sub-frame. At 1204, method 1200 includes driving, differentially, during each stylus sync sub-frame, at least some of the plurality of electrodes, referred to for that stylus sync sub-frame as sync-driven electrodes with synchronization waveforms. The synchronization waveforms are communicated electrostatically to an active stylus to synchronize the active stylus and the touch sensor. The driving includes differentially driving the sync-driven electrodes of the stylus sync sub-frame, such that a synchronization waveform used to drive one of the sync-driven electrodes is different than a synchronization waveform used to drive another of the sync-driven electrodes.

As shown at 1206, the differential driving indicated at 1204 may further include using two or more different synchronization waveforms to drive sync-driven electrodes in each of a plurality of spatial groupings of sensels. The two or more different synchronization waveforms may be configured to produce at least partially cancelling electrical conditions. This may reduce, in the event of a user's body part touching the display device on a contact patch over the spatial grouping of sync-driven electrodes, current flowing into the user's body part, relative to current which would flow in the case of undifferentiated driving of the sync-driven electrodes in the spatial grouping. In some examples, a spatial grouping may include synchronization waveforms of opposite polarity to provide cancellation, though this is but one example. Any size spatial groupings may be employed and, as described above, a wide range of different types and numbers of waveforms may be used to achieve cancelling electrical conditions. Such cancellation may, as described above, reduce current flowing into the user's body to avoid compromising current needed by the stylus for synchronization.

Method 1200 may further include selecting from among a plurality of different sets of sync-driven electrodes to use during stylus sync sub-frames. Typically, each set will omit some of the electrodes of the touch sensor and will differ from the other sets (e.g., an electrode is sync-driven for one set and not for another). In some cases, the sets may be constructed so that, for any given point on an operative portion of the touch sensor (i.e., a stylus contact point), using the different sets causes variation of distance between the closest sync-driven electrode and the stylus contact point. Typically, one of the sets will cause a reduction in distance between the stylus contact point and a closest sync-driven electrode, relative to another set of the sync-driven electrodes. The sets may be constructed so that this is below a threshold distance to provide desired synchronization signal strength to the stylus. The method may also include selecting from among the different sets based on position information associated with the active stylus. In one example, a set is selected to place a sync-driven electrode as close as possible to the current y-coordinate of the stylus, to thereby improve the strength of the synchronization signal. A variety of other position-based selections may be employed.

Figure 13:
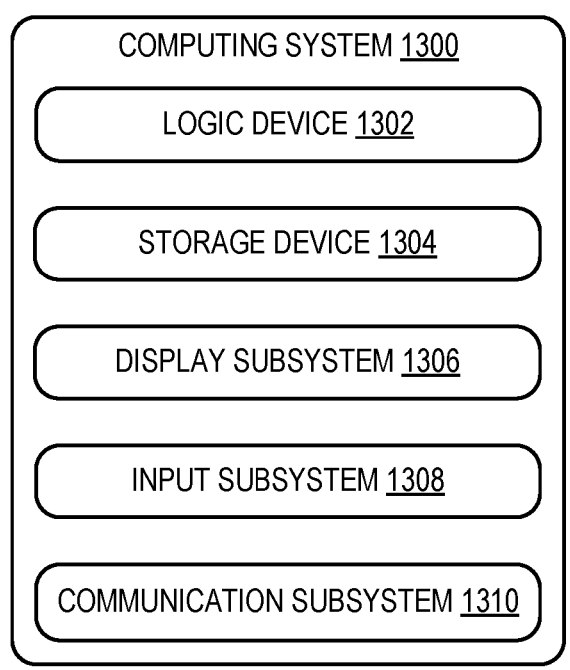
FIG. 13 shows a block diagram of an example computing device.

FIG. 13 schematically shows a non-limiting embodiment of a computing system 1300, one or more aspects of which may be used to implement the touch-sensing systems and methods described above. Computing system 1300 is shown in simplified form. Computing system 1300 may take the form of one or more personal computers, server computers, tablet computers, home-entertainment computers, network computing devices, gaming devices, mobile computing devices, mobile communication devices (e.g., smart phone), wearable devices, and/or other computing devices.

Computing system 1300 includes a logic machine 1302 and a storage machine 1304. Computing system 1300 may optionally include a display subsystem 1306, input subsystem 1308, communication subsystem 1310, and/or other components not shown in FIG. 13.

Logic machine 1302 may include one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

The logic machine may correspond to one or more of the various drive logic and receive logic described above. For example, logic and associated instructions may be implemented to select and apply waveforms to drive electrodes to achieve synchronization; process inbound signals induced as a result of excitation of capacitively coupled electrodes; determine position of an active stylus; select from different sets of sync-driven electrodes; etc.

Storage machine 1304 includes one or more physical devices configured to hold instructions executable by the logic machine to implement the methods and processes described herein. When such methods and processes are implemented, the state of storage machine 1304 may be transformed—e.g., to hold different data.

Storage machine 1304 may include removable and/or built-in devices. Storage machine 1304 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1304 may include volatile, nonvolatile, dynamic, static, read/write, read-only, random-access, sequential-access, location-addressable, file-addressable, and/or content-addressable devices.

Storage machine 1304 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1302 and storage machine 1304 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1300 implemented to perform a particular function. In some cases, a module, program, or engine may be instantiated via logic machine 1302 executing instructions held by storage machine 1304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

A "service", as used herein, is an application program executable across multiple user sessions. A service may be available to one or more system components, programs, and/or other services. In some implementations, a service may run on one or more server-computing devices.

When included, display subsystem 1306 may be used to present a visual representation of data held by storage machine 1304. This visual representation may take the form of a graphical user interface (GUI). As the herein described methods and processes change the data held by the storage machine, and thus transform the state of the storage machine, the state of display subsystem 1306 may likewise be transformed to visually represent changes in the underlying data. Display subsystem 1306 may include one or more display devices utilizing virtually any type of technology. Such display devices may be combined with logic machine 1302 and/or storage machine 1304 in a shared enclosure, or such display devices may be peripheral display devices.

When included, input subsystem 1308 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1310 may be configured to communicatively couple computing system 1300 with one or more other computing devices. Communication subsystem 1310 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1300 to send and/or receive messages to and/or from other devices via a network such as the Internet.

Another example provides a touch sensing system comprising a display device including a touch sensor having a plurality of electrodes, and drive logic coupled to the plurality of electrodes and configured to drive the plurality of electrodes during a plurality of touch-sensing frames, each of which includes a stylus sync sub-frame during which the drive logic drives at least some of the plurality of electrodes, referred to for that stylus sync sub-frame as sync-driven electrodes, with synchronization waveforms that are communicated electrostatically to cause synchronization of the display device with an active stylus, where for each of the stylus sync sub-frames, the drive logic is configured to differentially drive the sync-driven electrodes of such stylus sync sub-frame, such that a first synchronization waveform used to drive one of the sync-driven electrodes is different than a second synchronization waveform used to drive another of the sync-driven electrodes. In such an example, the drive logic may be configured to, for each stylus sync sub-frame, differentially drive sync-driven electrodes during that sub-frame such that, for a plurality of spatial groupings of sync-driven electrodes, two or more different synchronization waveforms are used to drive the sync-driven electrodes in the spatial grouping, the two or more different synchronization waveforms being configured to produce at least partially cancelling electrical conditions to reduce, in the event of a user's body part touching the display device on a contact patch over the spatial grouping of sync-driven electrodes, current flowing into the user's body part, relative to current which would flow in the case of undifferentiated driving of the sync-driven electrodes in the spatial grouping. In such an example, the drive logic may be configured, for any given one of the stylus sync sub-frames, to select from among a plurality of sets of sync-driven electrodes and differentially drive sync-driven electrodes in that set of sync-driven electrodes during the stylus sync sub-frame. In such an example, the spatial groupings may be distributed over a plurality of electrode sets that alternate in a row direction and in a column direction with respect to the two or more different synchronization waveforms. In such an example, the electrode sets that alternate in the column direction may be longer than the electrode sets that alternate in the row direction. In such an example, the drive logic may switch into and out of position-based selection of the plurality of spatial groupings of sync-driven electrodes. In such an example, the touch-sensing system alternatively or additionally may comprise an active stylus having receive logic configured to selectively activate and deactivate multiple different receivers within the receive logic based on knowledge of differential synchronization forms to be deployed by the drive logic during an upcoming stylus sync sub-frame. In such an example, within each spatial grouping, the drive logic may drive sync-driven electrodes using synchronization waveforms of opposite polarity. In such an example, the spatial groupings may be sized based on an expected minimum size of the contact patch. In such an example, the touch sensor may be an in-cell touch sensor.

Another example provides a touch-sensing method for a display device having a touch sensor with a matrix of electrodes comprising driving the electrodes during a plurality of touch-sensing frames, each of which includes a stylus sync sub-frame, and during each stylus sync sub-frame, driving at least some of the electrodes, referred to for that stylus sync sub-frame as sync-driven electrodes, with synchronization waveforms configured to be electrostatically communicated to an active stylus to synchronize the display device and the active stylus, where such driving during each stylus sync sub-frame includes differentially driving the sync-driven electrodes of that stylus sync sub-frame, such that a first synchronization waveform used to drive one of the sync-driven electrodes is different than a second synchronization waveform used to drive another of the sync-driven electrodes. In such an example, for each stylus sync sub-frame, differentially driving the sync-driven electrodes in that stylus sync sub-frame may include, for each of a plurality of spatial groupings of sync-driven electrodes in that stylus sync sub-frame, using two or more different synchronization waveforms to drive the sync-driven electrodes in the spatial grouping, the two or more different synchronization waveforms being configured to produce at least partially cancelling electrical conditions to reduce, in the event of a user's body part touching the display device on a contact patch over the spatial grouping of sync-driven electrodes, current flowing into the user's body part, relative to current which would flow in the case of undifferentiated driving of the sync-driven electrodes in the spatial grouping. In such an example, synchronization waveforms of opposite polarity may be used on sync-driven electrodes within each of the spatial groupings. In such an example, the differential driving of the sync-driven electrodes during each of the stylus sync sub-frame may include, for any given stylus sync sub-frame, selecting from among a plurality of sets of sync-driven electrodes and differentially driving the sync-driven electrodes in that set during the stylus sync sub-frame. In such an example, the spatial groupings may be distributed over a plurality of electrode sets that alternate in a row direction and in a column direction with respect to the two or more different synchronization waveforms. In such an example, the electrode sets that alternate in the column direction may be longer than the electrode sets that alternate in the column direction.

Another example provides a touch-sensing system comprising a display device including a touch sensor having a matrix of electrodes, drive logic coupled to the electrodes, where the drive logic is configured to drive the electrodes during a plurality of touch-sensing frames, each of which includes a stylus sync sub-frame during which the drive logic drives at least some of the electrodes, referred to for that stylus sync sub-frame as sync-driven electrodes, with synchronization waveforms to facilitate synchronization of the display device with an active stylus, where the drive logic is configured, for any given one of the stylus sync sub-frames, to select from among a plurality of sets of sync-driven electrodes and differentially drive sync-driven electrodes in that set of sync-driven electrodes during the stylus sync sub-frame, and where for each of the sets of sync-driven electrodes, the differential driving includes, for each a plurality of spatial groupings of sync-driven electrodes in the set, using two or more different synchronization waveforms in the spatial grouping which are configured to produce at least partially cancelling electrical conditions to reduce, in the event of a user's body part touching the display device on a contact patch over the spatial grouping, current flowing into the user's body part, relative to current which would flow in the case of undifferentiated driving of the sync-driven electrodes in the spatial grouping. In such an example, within each spatial grouping, the drive logic may drive sync-driven electrodes using synchronization waveforms of opposite polarity. In such an example, the electrode sets that alternate in the column direction may be longer than the electrode sets that alternate in the row direction. In such an example, the spatial groupings may be distributed over a plurality of electrode sets that alternate in a row direction and in a column direction with respect to the two or more different synchronization waveforms.

The configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A touch sensing system, comprising:
a display device including a touch sensor having a plurality of electrodes; and
drive logic coupled to the plurality of electrodes and configured to drive the plurality of electrodes during a plurality of touch-sensing frames, each of which includes a stylus sync sub-frame during which the drive logic drives at least some of the plurality of electrodes, referred to for that stylus sync sub-frame as sync-driven electrodes, with synchronization waveforms that are communicated electrostatically to cause synchronization of the display device with an active stylus;
where for each of the stylus sync sub-frames, the drive logic is configured to differentially drive the sync-driven electrodes of such stylus sync sub-frame, such that a first synchronization waveform used to drive one of the sync-driven electrodes is different than a second synchronization waveform used to drive another of the sync-driven electrodes.

2. The touch-sensing system of claim 1, where the drive logic is configured to, for each stylus sync sub-frame, differentially drive sync-driven electrodes during that sub-frame such that, for a plurality of spatial groupings of sync-driven electrodes, two or more different synchronization waveforms are used to drive the sync-driven electrodes in the spatial grouping, the two or more different synchronization waveforms being configured to produce at least partially cancelling electrical conditions to reduce, in the event of a user's body part touching the display device on a contact patch over the spatial grouping of sync-driven electrodes, current flowing into the user's body part, relative to current which would flow in the case of undifferentiated driving of the sync-driven electrodes in the spatial grouping.

3. The touch-sensing system of claim 2, where the spatial groupings are distributed over a plurality of electrode sets that alternate in a row direction and in a column direction with respect to the two or more different synchronization waveforms.

4. The touch-sensing system of claim 3, where the electrode sets that alternate in the column direction are longer than the electrode sets that alternate in the row direction.

5. The touch-sensing system of claim 2, where:
the drive logic is configured, for any given one of the stylus sync sub-frames, to select from among a plurality of sets of sync-driven electrodes and differentially drive sync-driven electrodes in that set of sync-driven electrodes during the stylus sync sub-frame.

6. The touch-sensing system of claim 2, where the drive logic switches into and out of position-based selection of the plurality of spatial groupings of sync-driven electrodes.

7. The touch-sensing system of claim 2, further comprising an active stylus having receive logic configured to selectively activate and deactivate multiple different receivers within the receive logic based on knowledge of differential synchronization forms to be deployed by the drive logic during an upcoming stylus sync sub-frame.

8. The touch-sensing system of claim 2, where within each spatial grouping, the drive logic drives sync-driven electrodes using synchronization waveforms of opposite polarity.

9. The touch-sensing system of claim 2, where the spatial groupings are sized based on an expected minimum size of the contact patch.

10. The touch-sensing system of claim 1, where the touch sensor is an in-cell touch sensor.

11. A touch-sensing method for a display device having a touch sensor with a matrix of electrodes, comprising:
driving the electrodes during a plurality of touch-sensing frames, each of which includes a stylus sync sub-frame; and
during each stylus sync sub-frame, driving at least some of the electrodes, referred to for that stylus sync sub-frame as sync-driven electrodes, with synchronization waveforms configured to be electrostatically communicated to an active stylus to synchronize the display device and the active stylus, where such driving during each stylus sync sub-frame includes differentially driving the sync-driven electrodes of that stylus sync sub-frame, such that a first synchronization waveform used to drive one of the sync-driven electrodes is different than a second synchronization waveform used to drive another of the sync-driven electrodes.

12. The touch-sensing method of claim 11, where for each stylus sync sub-frame, differentially driving the sync-driven electrodes in that stylus sync sub-frame includes, for each of a plurality of spatial groupings of sync-driven electrodes in that stylus sync sub-frame, using two or more different synchronization waveforms to drive the sync-driven electrodes in the spatial grouping, the two or more different synchronization waveforms being configured to produce at least partially cancelling electrical conditions to reduce, in the event of a user's body part touching the display device on a contact patch over the spatial grouping of sync-driven electrodes, current flowing into the user's body part, relative to current which would flow in the case of undifferentiated driving of the sync-driven electrodes in the spatial grouping.

13. The touch-sensing method of claim 12, where synchronization waveforms of opposite polarity are used on sync-driven electrodes within each of the spatial groupings.

14. The touch-sensing method of claim 12, where the differential driving of the sync-driven electrodes during each of the stylus sync sub-frame includes, for any given stylus sync sub-frame, selecting from among a plurality of sets of sync-driven electrodes and differentially driving the sync-driven electrodes in that set during the stylus sync sub-frame.

15. The touch-sensing method of claim 12, where the spatial groupings are distributed over a plurality of electrode sets that alternate in a row direction and in a column direction with respect to the two or more different synchronization waveforms.

16. The touch-sensing method of claim 12, where the electrode sets that alternate in the column direction are longer than the electrode sets that alternate in the column direction.

17. A touch-sensing system, comprising:
a display device including a touch sensor having a matrix of electrodes;
drive logic coupled to the electrodes;
where the drive logic is configured to drive the electrodes during a plurality of touch-sensing frames, each of which includes a stylus sync sub-frame during which the drive logic drives at least some of the electrodes, referred to for that stylus sync sub-frame as sync-driven electrodes, with synchronization waveforms to facilitate synchronization of the display device with an active stylus;
where the drive logic is configured, for any given one of the stylus sync sub-frames, to select from among a plurality of sets of sync-driven electrodes and differentially drive sync-driven electrodes in that set of sync-driven electrodes during the stylus sync sub-frame; and
where for each of the sets of sync-driven electrodes, the differential driving includes, for each a plurality of spatial groupings of sync-driven electrodes in the set, using two or more different synchronization waveforms in the spatial grouping which are configured to produce at least partially cancelling electrical conditions to reduce, in the event of a user's body part touching the display device on a contact patch over the spatial grouping, current flowing into the user's body part, relative to current which would flow in the case of undifferentiated driving of the sync-driven electrodes in the spatial grouping.

18. The touch-sensing system of claim 17, where within each spatial grouping, the drive logic drives sync-driven electrodes using synchronization waveforms of opposite polarity.

19. The touch-sensing system of claim 17, where the electrode sets that alternate in the column direction are longer than the electrode sets that alternate in the row direction.

20. The touch-sensing system of claim 17, where the spatial groupings are distributed over a plurality of electrode sets that alternate in a row direction and in a column direction with respect to the two or more different synchronization waveforms.

* * * * *